(12) United States Patent
Lorenzetto et al.

(10) Patent No.: US 12,527,534 B2
(45) Date of Patent: Jan. 20, 2026

(54) RADIOLOGICAL IMAGING DEVICE WITH IMPROVED SCOUTING FUNCTIONALITY

(71) Applicant: Epica International, Inc., San Clemente, CA (US)

(72) Inventors: Cosimo Lorenzetto, Impruneta (IT);
Leonardo Manetti, Montevarchi (IT);
Massimiliano Leonori, Lucca (IT);
Marco Bargiotti, Sesto Fiorentino (IT)

(73) Assignee: EPICA INTERNATIONAL, INC., San Clemente, CA (US)

( * ) Notice: Subject to any disclaimer, the term of this patent is extended or adjusted under 35 U.S.C. 154(b) by 357 days.

(21) Appl. No.: 18/152,480

(22) Filed: Jan. 10, 2023

(65) Prior Publication Data

US 2024/0225576 A1    Jul. 11, 2024

(51) Int. Cl.
| | |
|---|---|
| *A61B 6/00* | (2024.01) |
| *A61B 6/04* | (2006.01) |
| *A61B 6/40* | (2024.01) |

(52) U.S. Cl.
CPC ............ *A61B 6/488* (2013.01); *A61B 6/0407* (2013.01); *A61B 6/4435* (2013.01); *A61B 6/5241* (2013.01); *A61B 6/547* (2013.01); *A61B 6/4078* (2013.01); *A61B 6/4085* (2013.01)

(58) Field of Classification Search
None
See application file for complete search history.

(56) References Cited

U.S. PATENT DOCUMENTS

| | | | |
|---|---|---|---|
| 9,492,126 | B2 | 11/2016 | Stoutenburgh et al. |
| 9,492,127 | B2 | 11/2016 | Stoutenburgh et al. |
| 9,510,793 | B2 | 12/2016 | Stoutenburgh et al. |
| 10,265,042 | B2 | 4/2019 | Stoutenburgh et al. |
| 10,413,265 | B2 | 9/2019 | Stoutenburgh et al. |
| 10,582,906 | B2 | 3/2020 | Stoutenburgh et al. |
| 10,973,484 | B2 | 4/2021 | Stoutenburgh et al. |
| 2012/0121062 | A1 | 5/2012 | Sowards-Emmerd et al. |
| 2014/0275953 | A1* | 9/2014 | Gregerson ........... A61B 6/4405 600/407 |
| 2016/0302871 | A1* | 10/2016 | Gregerson ............. A61B 34/20 |
| 2019/0192097 | A1 | 6/2019 | Stoutenburgh et al. |

(Continued)

FOREIGN PATENT DOCUMENTS

| | | |
|---|---|---|
| EP | 3875031 A1 | 9/2021 |
| KR | 10-1525040 B1 | 6/2015 |

(Continued)

OTHER PUBLICATIONS

U.S. Appl. No. 61/932,034, filed Jan. 27, 2014, 17 pages.

(Continued)

*Primary Examiner* — Dani Fox
(74) *Attorney, Agent, or Firm* — STEPTOE LLP; Carl B. Wischhusen

(57) ABSTRACT

A radiological image is acquired of a part of a patient by positioning the patient within an analysis zone of the radiologic imaging device and setting an imaging start location. The part of the patient to be diagnosed is included between the start location and an end location. A series of images is acquired with a radiologic beam beginning at the start location and continuing until the end location is imaged. The images in the series of images are stitched together to form a composite scouting image.

24 Claims, 14 Drawing Sheets

(56) References Cited

U.S. PATENT DOCUMENTS

2019/0282185 A1\* 9/2019 Gregerson ............ A61B 6/4488
2020/0305807 A1 10/2020 Rose et al.
2021/0275122 A1\* 9/2021 Wen ..................... A61B 6/0407

FOREIGN PATENT DOCUMENTS

WO 2015/112951 A1 7/2015
WO 2015/112953 A1 7/2015

OTHER PUBLICATIONS

U.S. Appl. No. 61/944,956, filed Feb. 26, 2014, 40 pages.
Invitation to Pay Additional Fees from International Patent Application No. PCT/US2024/010815, Apr. 16, 2024, 11 pages.
International Search Report & Written Opinion from International Patent Application No. PCT/US2024/010815, Jul. 3, 2024, 17 pages.

\* cited by examiner

| Input Parameters | | | Output Configuration Parameters | | | |
|---|---|---|---|---|---|---|
| Imaging Procedure | Tissue Region of Interest | Patient Size | kV | mA | ms | Filter |
| Tomography | Hard / Head | Any | 100 | 30 | 10 | 3 mm Al + 0.2 mm Cu |
| Tomography | Hard / Thorax | Any | 100 | 60 | 5 | 3 mm Al + 0.2 mm Cu |
| Tomography | Soft / Abdomen | Any | 60 | 60 | 10 | 2 mm Al |
| Tomography | Soft / Limbs | Any | 60 | 30 | 15 | 2 mm Al |
| Radiography | Head | Small | 70 | 20 | 10 | 2 mm Al |
| Radiography | Thorax | Small | 80 | 25 | 2 | 2 mm Al |
| Radiography | Abdomen | Small | 75 | 30 | 10 | 2 mm Al |
| Radiography | Limbs | Small | 45 | 30 | 15 | 2 mm Al |
| Radiography | Head | Medium | 80 | 30 | 20 | 2 mm Al |
| Radiography | Thorax | Medium | 85 | 30 | 2 | 2 mm Al |
| Radiography | Abdomen | Medium | 80 | 40 | 10 | 2 mm Al |
| Radiography | Limbs | Medium | 50 | 30 | 20 | 2 mm Al |
| Radiography | Head | Large | 85 | 30 | 20 | 2 mm Al |
| Radiography | Thorax | Large | 95 | 30 | 2 | 2 mm Al |
| Radiography | Abdomen | Large | 90 | 60 | 20 | 2 mm Al |
| Radiography | Limbs | Large | 55 | 30 | 20 | 2 mm Al |
| Fluoroscopy | Head | Small | 70 | 20 | 5 | 2 mm Al |
| Fluoroscopy | Thorax | Small | 80 | 25 | 2 | 2 mm Al |
| Fluoroscopy | Abdomen | Small | 75 | 30 | 5 | 2 mm Al |
| Fluoroscopy | Limbs | Small | 45 | 30 | 5 | 2 mm Al |
| Fluoroscopy | Head | Medium | 80 | 30 | 5 | 2 mm Al |
| Fluoroscopy | Thorax | Medium | 85 | 30 | 2 | 2 mm Al |
| Fluoroscopy | Abdomen | Medium | 80 | 40 | 5 | 2 mm Al |
| Fluoroscopy | Limbs | Medium | 50 | 30 | 5 | 2 mm Al |
| Fluoroscopy | Head | Large | 85 | 30 | 5 | 2 mm Al |
| Fluoroscopy | Thorax | Large | 95 | 30 | 2 | 2 mm Al |
| Fluoroscopy | Abdomen | Large | 90 | 60 | 5 | 2 mm Al |
| Fluoroscopy | Limbs | Large | 55 | 30 | 5 | 2 mm Al |

FIG. 2C

RADIOLOGICAL IMAGING DEVICE WITH IMPROVED SCOUTING FUNCTIONALITY

BACKGROUND

A radiological imaging device may include a bed on which a patient is placed, a control station able to control the functioning of the device, and a gantry—a device with a cavity in which the portion of the patient to be analyzed is inserted and is suitable to perform the radiological imaging of the patient. Inside the gantry, the radiological imaging device includes a source suitable to emit radiation, such as X-rays, on command and a detector suitable to receive the radiation after it has traversed the portion of the patient to be analyzed. The device then sends a signal suitable to permit visualization of the internal anatomy of the patient. Sometimes, given the need to visualize specific parts of the body, it may be beneficial to first "scout" the area to be imaged. Scouting involves taking a preview or an overview image to assess the size and shape of the area to be diagnosed to plan a subsequent image acquisition.

SUMMARY

In one aspect, the disclosed embodiments provide a method to acquire a radiological image of a part of a patient. The method includes positioning the patient within an analysis zone and setting an imaging start location. The part of the patient to be diagnosed is included between the start location and an end location. The method further includes acquiring with a radiological beam a series of images beginning at the start location and continuing until the end location is imaged. The method further includes stitching together the images in the series of images to form a composite scouting image.

Embodiments may include one or more of the following features.

The pre-determined distance interval may be between about 8 mm and about 12 mm or between about 4 mm and about 6 mm. The radiological beam may be cone shaped or fan shaped. The end location may be set when the start location is set or may be determined when the acquiring is stopped by an operator. The method may further include selecting a thickness of a stack or a thickness of the radiological beam.

The method may further include acquiring a computed tomography image based at least in part on the composite scouting image. The method may further include performing a surgical procedure based on the scouting image. The scouting image may be of the whole body of the patient.

The acquiring may be performed using a gantry having a rotatable ring to which a source that produces the radiological beam and a detector are positioned, and the acquiring may be performed at a defined rotation angle. A plurality of composite scouting images may be acquired, each at respective defined rotation angle. The method may further include acquiring a computed tomography image based at least in part on the plurality of composite scouting images.

In another aspect, the disclosed embodiments provide a radiological imaging device including a gantry defining an analysis zone in which at least a part of a patient is placed. The device further includes a source suitable to emit radiation that passes through the at least part of the patient, the radiation defining a central axis of propagation. The device further includes a detector arranged to receive the radiation and to generate data signals based on the radiation received. The device further includes a gantry rotation apparatus that includes a ring to which the source and the detector are mounted and a rotational bearing member configured to rotate the ring. The device further includes a controller adapted to acquire an image from data signals received continuously from the detector while the gantry rotation apparatus continuously rotates the ring and the source emitting the radiation and the detector receiving the radiation that are mounted to the ring, so as to scan the at least part of the patient. The device further includes a translational mechanism that translates the gantry and a sensor system to trigger acquisition of images at a defined interval as the gantry translates.

Embodiments may include one or more of the following features.

The pre-determined distance interval may be between about 8 mm and about 12 mm or between about 4 mm and about 6 mm. The device may further include a bed including a patient head support system. The device may further include a pole system attached to the gantry, the pole system including cameras and capable of being folded out of the analysis zone. The sensor system may include a laser-tracked track with discrete steps or notches that are spaced according to said defined interval.

BRIEF DESCRIPTION OF THE DRAWINGS

FIG. 2C is a table containing predetermined relationships for configuring an X-ray source, according to an embodiment of the present invention;

Figure 1:
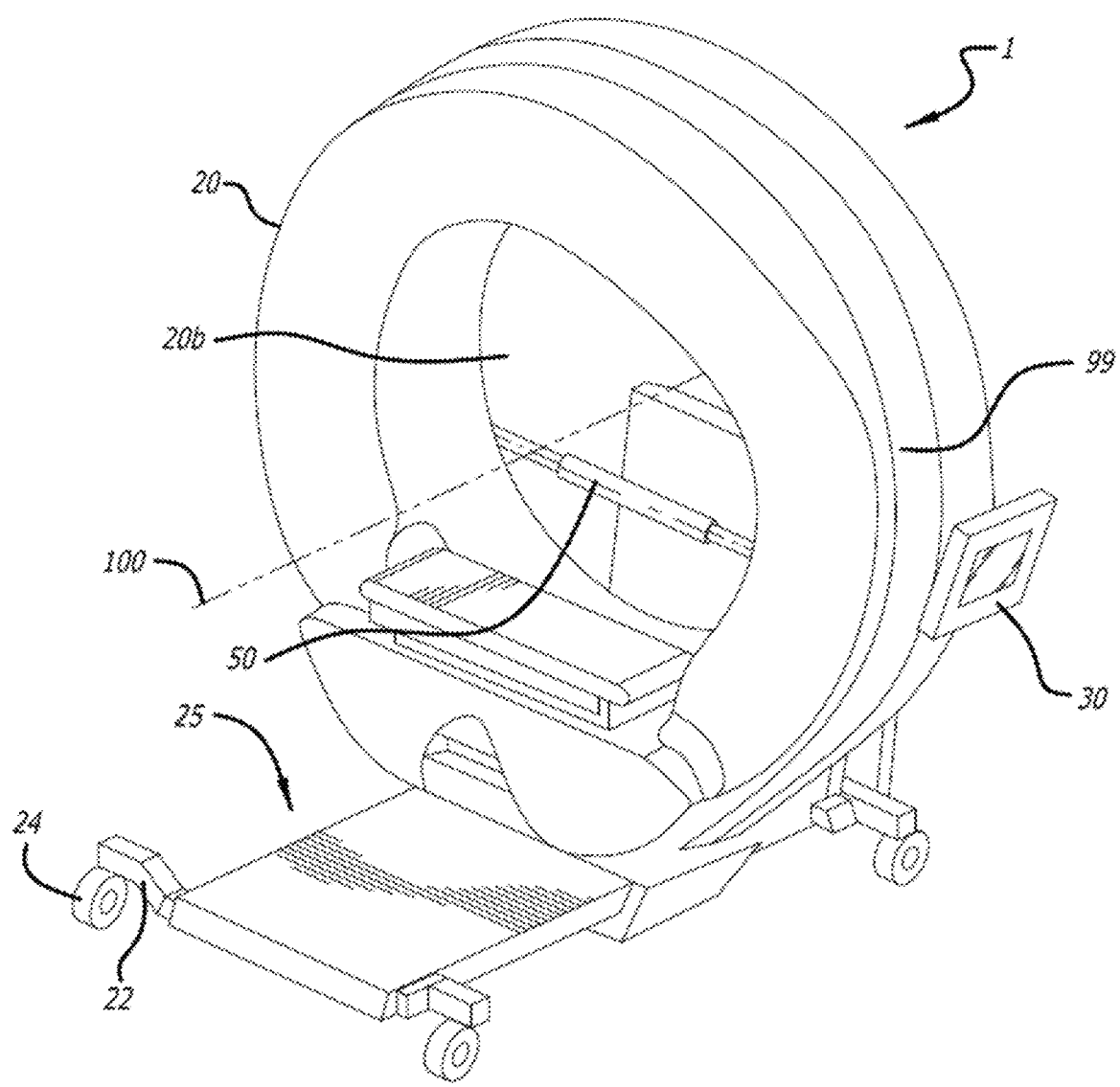
FIG. 1 is a diagram of a radiological imaging device, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

While imaging a patient, it may be beneficial to first "scout" the area to be imaged. Scouting involves taking a preview or an overview image to assess the size and shape of the area to be diagnosed to plan a subsequent image acquisition. A method for improved radiological imaging using scouting is described below. This method includes setting an imaging start location and an imaging end location, where the part of the patient to be diagnosed is included between the start and end locations. The method then acquires a series of images beginning at the start location and continuing a pre-determined distance interval until the end location is imaged and then stitches together the images to form a single scouting image. This improved scouting image can be used to plan more detailed imaging or a surgical procedure. This system overcomes the problems in prior art systems of scout images not being detailed or extensive enough. Furthermore, the embodiments disclosed herein overcome precision problems arising in other approaches due to deficiencies in mechanical precision and deformation problems arising in other approaches due to deficiencies in software processing.

Reference is now made to FIG. 1, which is a three-dimensional perspective view of an embodiment of radiological imaging device 1 that performs long scouting and other tasks. Radiological imaging device 1 may be used to perform two- and three-dimensional scans on a patient's body. Radiological imaging device 1 includes a gantry 20 having a housing 99. Gantry 20 defines a preferred axis of extension 20a (shown in FIG. 2B). The gantry also includes a transportation mechanism 25 and a control unit 30.

Figure 3A:
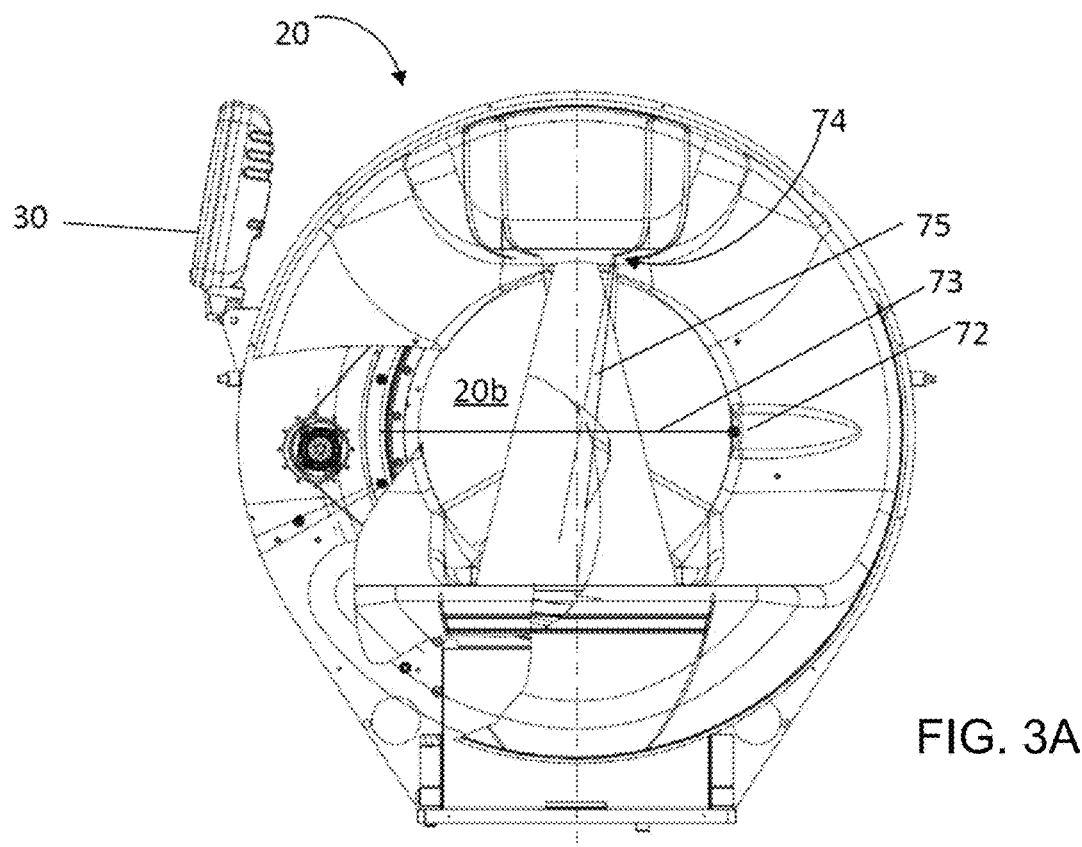
FIG. 3A is a diagram of a gantry subassembly with a cut-away portion, according to an embodiment of the radiological imaging device of FIG. 1.
Figure 3B:
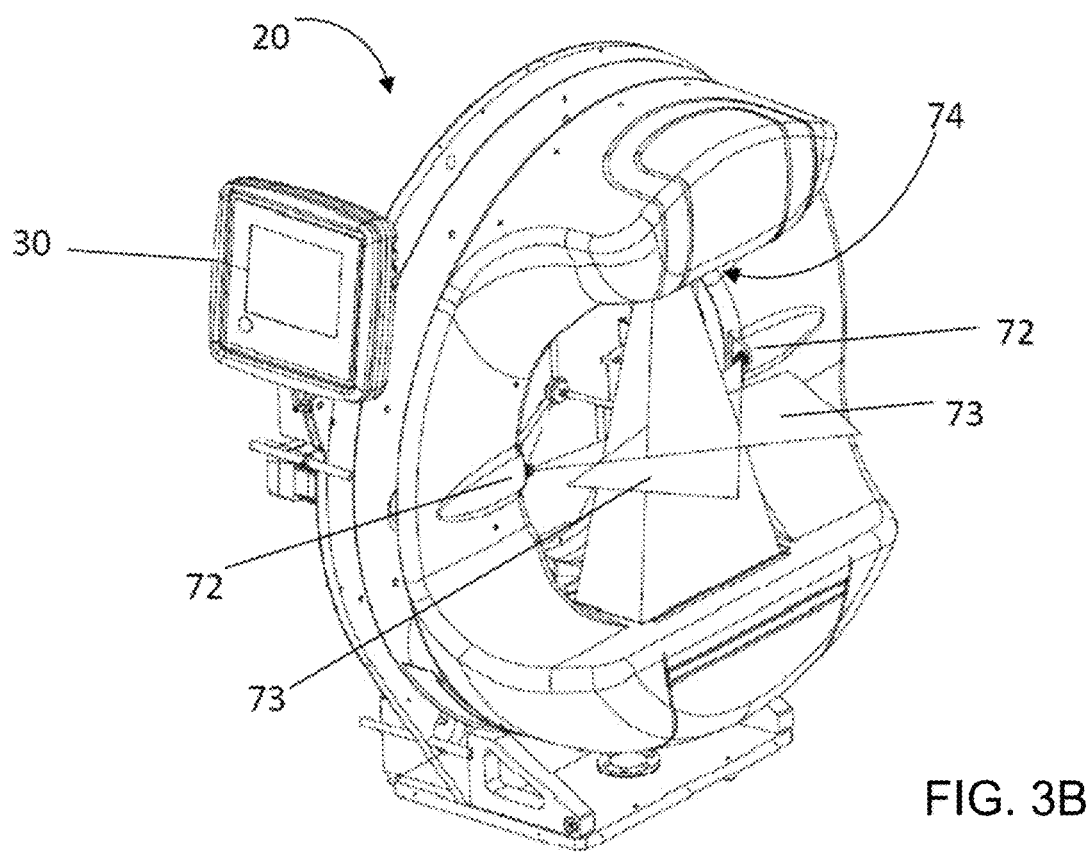
FIG. 3B is a perspective view of the gantry subassembly shown in FIG. 3A.

Control unit 30 is mounted on gantry 20 (as shown in FIGS. 1, 3A, and 3B) and is capable of controlling gantry 20 by transferring data and command signals to gantry 20 using communication means. In some embodiments, control unit 30 may be housed in a stand-alone unit (not shown) such as, for example, a workstation cart, or may be formed of multiple parts, such as a first part mounted on gantry 20 and a second part housed in a stand-alone unit. These examples are merely illustrative in nature, and, in other embodiments, control unit 30 may be located at other positions and locations besides those described above.

Gantry 20 may be mounted onto transportation mechanism 25 (e.g., a cart) in order to be transported to a desired location. In one embodiment, transportation mechanism 25 includes at least four wheels 24 that are mounted to transportation mechanism 25 via brackets 22. In one preferred embodiment, brackets 22 are v-shaped (as shown in FIG. 1) to accommodate wheels 24 of varying sizes, while still maintaining transportation mechanism 25 as close to the floor as possible. Moreover, the v-shaped brackets allow the diameter of each wheel 24 to be substantially equal or, preferably, substantially greater than the distance between transportation mechanism 25 and the floor, which helps to maintain a constant distance between transportation mechanism 25 and the floor. The distance between transportation mechanism 25 and the floor is typically small, thus allowing the size of gantry 20 to increase. However, a person skilled in the art would understand that any other suitable shape for brackets 22 and/or any other means of attaching wheels 24 to transportation mechanism 25 can be used as well.

Figure 2A:
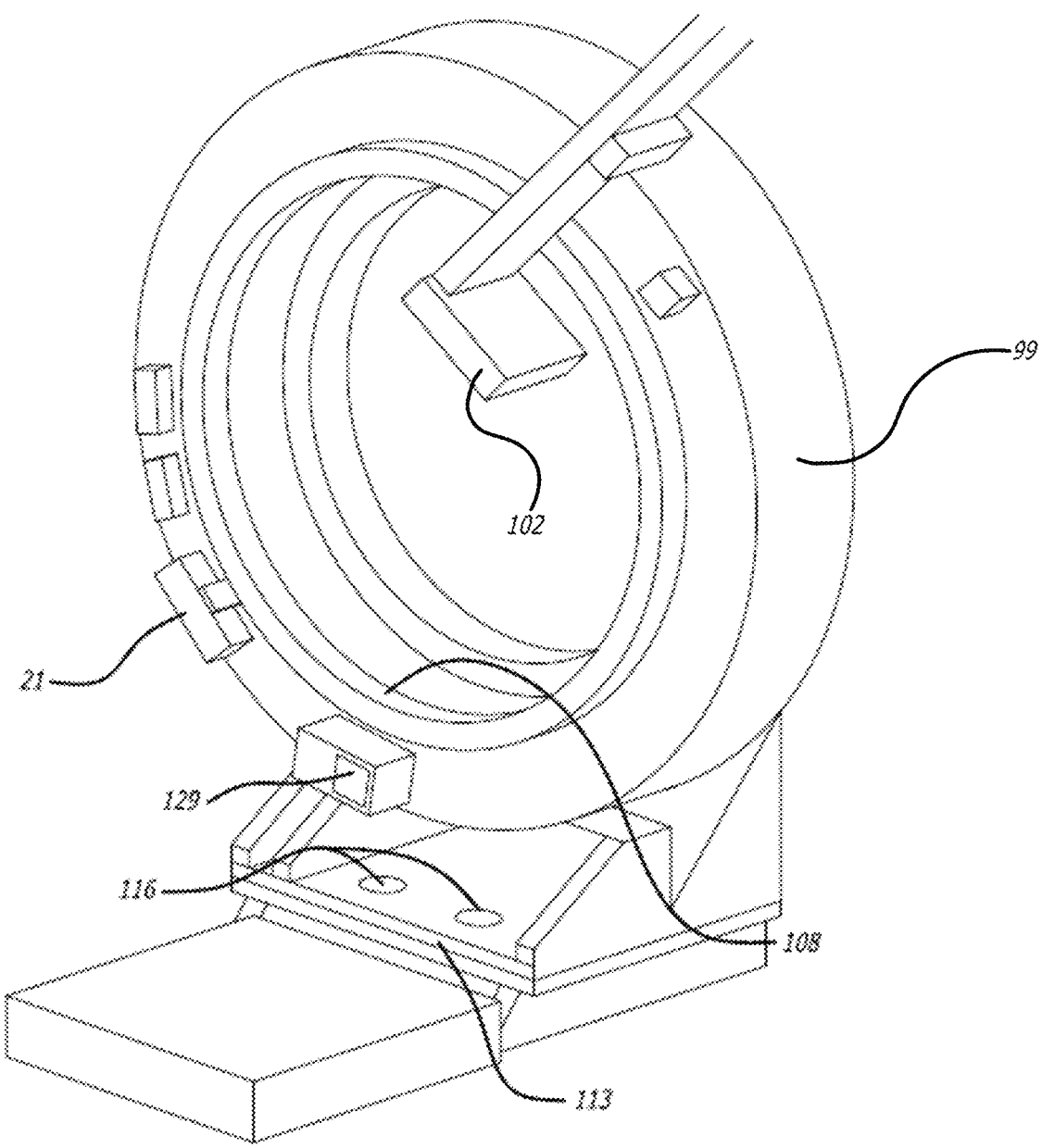
FIG. 2A is a diagram of a partial section of the radiological imaging device of FIG. 1, according to an embodiment of the present invention.

FIG. 2A shows a more detailed, three-dimensional perspective view of gantry 20 and associated components of radiological imaging device 1. Housing 99 of gantry 20 includes the various components used to perform the radiological scan. These components include a radiation source 21 (e.g., X-ray source) with a central axis of propagation 21a (shown in FIG. 2B), a radiation detector 102 that receives the radiation emitted by radiation source 21. Gantry 20 further defines an analysis zone 20b in which the patient's entire body or a particular body part to be imaged is placed during scanning. In some embodiments, gantry 20 also includes a laser positioning system that includes at least one horizontal laser 72 and one vertical laser 74 (FIGS. 3A and 3B).

Radiation source 21 emits radiation capable of traversing the patient's body and can interact with the tissues and fluids present inside the patient's body. In one embodiment, radiation source 21 emits ionizing radiation, more particularly, X-rays. In some embodiments, radiological imaging device 1 includes a collimator adjacent to radiation source 21 to constrain the radiation on radiation detector 102 and to modify the radiation field in order to adjust it to the position of radiation detector 102.

Figure 2B:
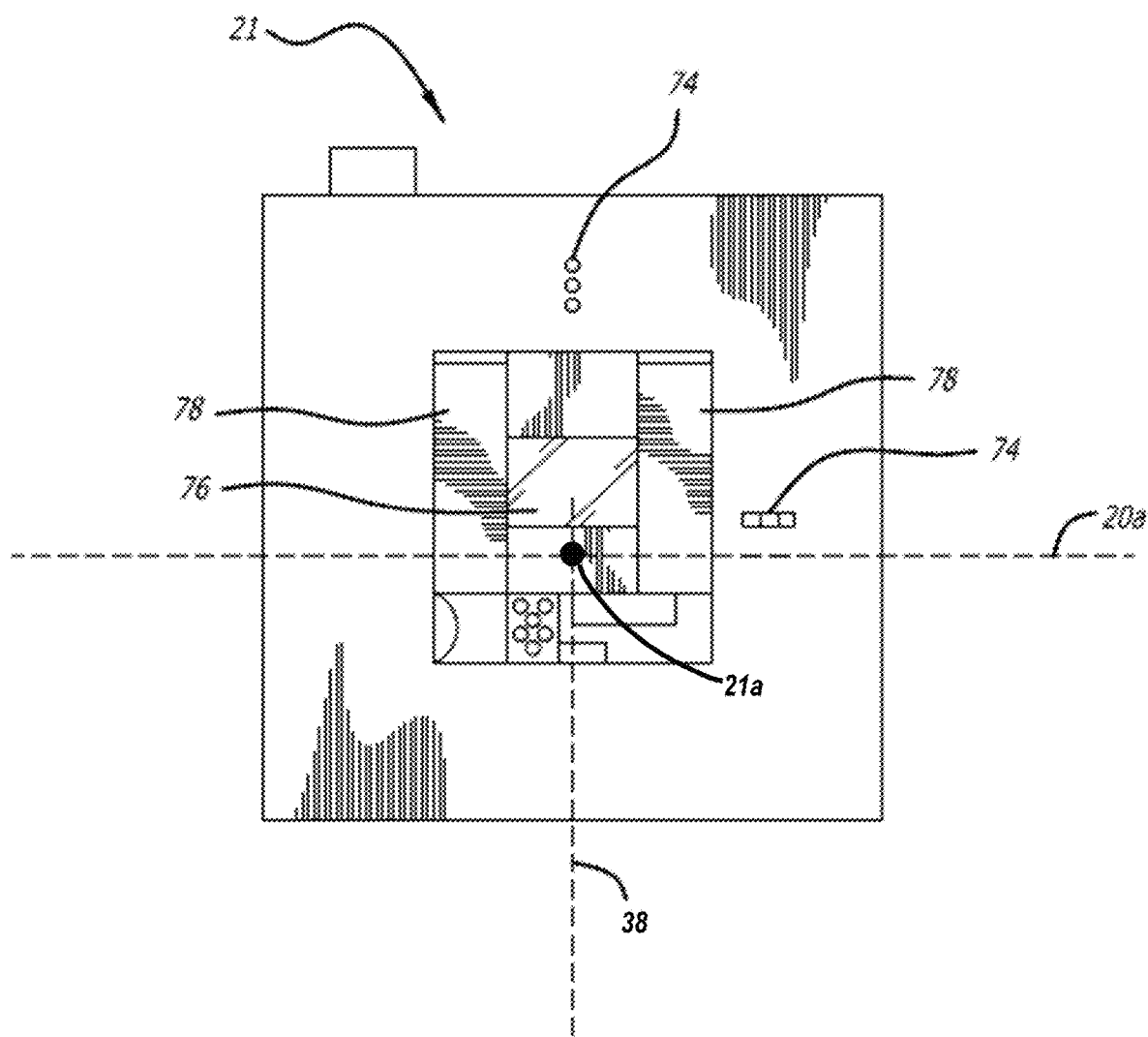
FIG. 2B is a diagram of a source subassembly of the radiological imaging device of FIG. 1, according to an embodiment of the present invention.

FIG. 2B shows a more detailed, perspective view of radiation source 21 and its associated components. As mentioned above, collimator 76, which is used to constrain the radiation on radiation detector 102, includes an X-ray filter (not shown) positioned between radiation source 21 and radiation detector 102, e.g., a bowtie filter. The X-ray filter modifies the shape of the radiation beam (e.g., X-ray) emitted from radiation source 21 in a direction of a central axis of propagation 21a, which extends in a direction orthogonal to the plane of the figure and, therefore, is depicted as a point at the vertex of axes 20a and 38. Specifically, the X-ray filter modifies the energy of the emitted radiation along central axis of propagation 21a, relative to outer edges of the radiation beam, by absorbing the low power X-rays near the outer edges of the radiation beam, thereby modifying the energy distribution of the emitted radiation along axes 20a and 38, prior to the X-rays traversing the patient. In one embodiment, the X-ray filter includes a sheet material (e.g., aluminum and/or copper sheet) of predetermined thickness suitable for absorbing the radiation. The thickness of the radiation-absorbing sheet is determined along central axis of propagation 21a.

In another embodiment, a plurality of X-ray filters (not shown) may be stored at different locations in gantry 20. Each X-ray filter of the plurality of X-ray filters differs from the others at least in terms of shape and may also differ in terms of the material (e.g., aluminum and/or copper) and/or the thickness of the sheet. Control unit 30 can cause a motorized mechanism (not shown) provided within gantry 20 to retrieve a selected X-ray filter (e.g., selected by control unit 30 in a manner to be described further herein below) from storage and position the selected X-ray filter in front of radiation source 21.

In another embodiment, the radiological device operator inputs patient-specific information, for example, the types of imaging procedures (e.g., fluoroscopy, tomography, or radiography) to be performed on the patient, the species of the patient (e.g., human or animal), the patient's weight, tissue type to be imaged or the like, into control unit 30. Based on the inputted information, control unit 30 automatically configures an optimal radiation dosage to be used on the patient by radiological imaging device 1. Moreover, based on some predetermined relationships among the different patient specific information, control unit 30 determines the emission energy of the X-rays and/or the type of X-ray filter to be placed in front of radiation source 21. Examples of such predetermined relationships are shown in the table of FIG. 2C, which are defined in accordance with lookup tables, conditional statement algorithms, and/or mathematical formulas implemented on control unit 30. Accordingly, radiological imaging device 1 can perform the selected imaging procedure with an X-ray dosage that is safe for the patient, as well as the operator, while maintaining optimal image quality. The emission energy of the X-rays depends on parameters, such as X-ray tube voltage, X-ray tube current, and exposure time.

For example, control unit 30 can perform the aforementioned determination of X-ray emission energy and/or select an X-ray filter type based on predetermined relationships (e.g., defined in accordance with lookup table(s), conditional statement algorithm(s), and/or mathematical formula(s) implemented on control unit 30, although these examples are not limiting) between the patient information, the radiological imaging procedure selected to be performed, the X-ray emission energy, and the materials and thicknesses of the X-ray filters available in the plurality of X-ray filters located inside the gantry. Examples of such predetermined relationships are shown in the table of FIG. 2C. By way of example and not of limitation, if while inputting the patient specific information in control unit 30, an operator specifies that a high-resolution computed tomography (CT) scan is to be performed on hard tissues (e.g., the thorax region), control unit 30 can determine the operating parameters of radiation source 21 for such specification using a lookup table (for example, FIG. 2C). Specifically, using the lookup table of FIG. 2C, control unit 30 can determine that the aforementioned input correlates to operating parameters for radiation source 21 of 100 kV and 60 mA for 5 ms, and for the X-ray filter with a 3 mm thick aluminum sheet and a 0.2 mm thick copper sheet. As another example, if an operator specifies (by way of control unit 30) that high-resolution tomography is to be performed on soft tissues (e.g., an abdominal region), control unit 30 determines, via the lookup table of FIG. 2C, that the aforementioned input correlates to operating parameters for radiation source 21 of 60 kV and 60 mA for 10 ms and an X-ray filter with a 2-mm thick sheet of aluminum. Such variables can be adjusted depending on the target being scanned.

In yet another embodiment, radiation source 21 emits either a cone-shaped beam or a fan-shaped beam of radiation using collimator 76, which can modify the beam shape. Collimator 76, as shown in FIG. 2B, includes at least two movable plates 78, preferably, four movable plates, surrounding the area of X-ray emission and, therefore, substantially blocking the radiation. An operator can place movable plates 78 of collimator 76 in an open configuration, a slit configuration or in between those two configurations using a motorized mechanism (not shown) controlled by control unit 30. The operator can also configure movable plates 78 along an axis of translation that is substantially perpendicular to central axis of propagation 21a and substantially perpendicular or parallel to axis of extension 20a, using the motorized mechanism controlled by control unit 30.

In some embodiments, the motorized mechanism includes at least one independent motor for each movable plate 78 and an additional motor for the X-ray filter. When collimator 76 is configured in the open configuration, radiation from radiation source 21 is not blocked and travels along central axis of propagation 21a in the shape of a cone (one of ordinary skill in the art would understand that the term "cone," as used throughout the present description, broadly includes geometries having a circular or a non-circular base, e.g., square or rectangular). However, when collimator 76 is configured as a slit, a portion of the radiation of radiation source 21 is blocked, and thus the unblocked radiation propagates along central axis of propagation 21a in the shape of a fan (i.e., a cross-section of the cone-shaped radiation) oriented in a plane perpendicular to axis of extension 20a. Thus, in one embodiment, an operator may configure radiation source 21 to emit either a cone-shaped beam or a fan-shaped beam by virtue of collimator 76, and perform different types of imaging with radiological imaging device 1, for example, cone-beam tomography or fan-beam tomography, respectively.

In another embodiment, the shape of the beam of radiation emitted by radiation source 21 can be modified by positioning a filtering means (not shown) on top of radiation source 21 to affect the characteristics of the beam of radiation before it reaches the target. In particular, in one embodiment, radiation source 21 can emit radiation in a plurality of fan-shaped beams of radiation by using the filtering means. By using a plurality of fan-shaped beams, the image quality of the scanned image can be improved due to, inter alia, reduction of light scattering as compared to cone-shaped radiation emission. In yet another embodiment, the filtering means includes, for example, one or more filters, one or more grids, or an adjustable diaphragm. In addition, in another embodiment, the filtering means can include one more stackable filters or stackable grids. In some embodiments, the filtering means is movable. In embodiments, an anti-scatter grid may be positioned on the flat panel sensor, thereby affecting the characteristics of the received radiation after it has passed through the patient—but before it has reached the sensor.

In one embodiment, the laser positioning system, which includes horizontal laser 72 and vertical laser 74 (see FIGS.

3A and 3B), is used in conjunction with an adjustable bed. The laser positioning system, when activated by control unit 30, projects visual markers onto the patient in order to facilitate positioning of the patient on a bed within analysis zone 20b. Further details can be found in U.S. Provisional Patent Application Nos. 61/932,034 and 61/944,956, which are incorporated herein by reference in their entireties.

Referring again to the drawings and more particularly to FIGS. 3A and 3B, which shows an embodiment of gantry 20 of radiological imaging device 1. As mentioned above, the laser positioning system is mounted on gantry 20 and includes at least one horizontal laser 72 and/or at least one vertical laser 74. Horizontal laser 72 projects horizontal visual markers 73 to aid the operator in adjusting the height and inclination of the patient, and vertical laser 74 projects a top-down marker 75 to aid the operator in adjusting the lateral centering of the patient with respect to gantry 20. The operator adjusts the positioning of the patient by observing the position of the patient with respect to projected laser markers 73 and 75, and thus with respect to analysis zone 20b. The operator then manually repositions the patient on the bed by adjusting controls of the bed (not shown in FIGS. 3A and 3B) until the patient is in the correct position for imaging. In one embodiment, two mutually oblique horizontal lasers 72 are provided in order to reciprocally intersect and define a horizontal marker segment. In the embodiment, the two horizontal lasers project visual markers at opposite angles to each other along an inclined axis.

In some embodiments, in analysis zone 20b radiation detector 102 is located opposite radiation source 21 and collimator 76 to detect radiation once it has traversed the portion of the patient's body to be examined. Once the radiation is received, radiation detector 102 converts the received radiation into equivalent electrical signals and transfers the signal to control unit 30 at a particular frame rate. Once received, control unit 30 processes the data signals to acquire images. One method of controlling the emission of radiation by the source and the detection of the radiation by the detector will be described more fully below.

Figure 4A:
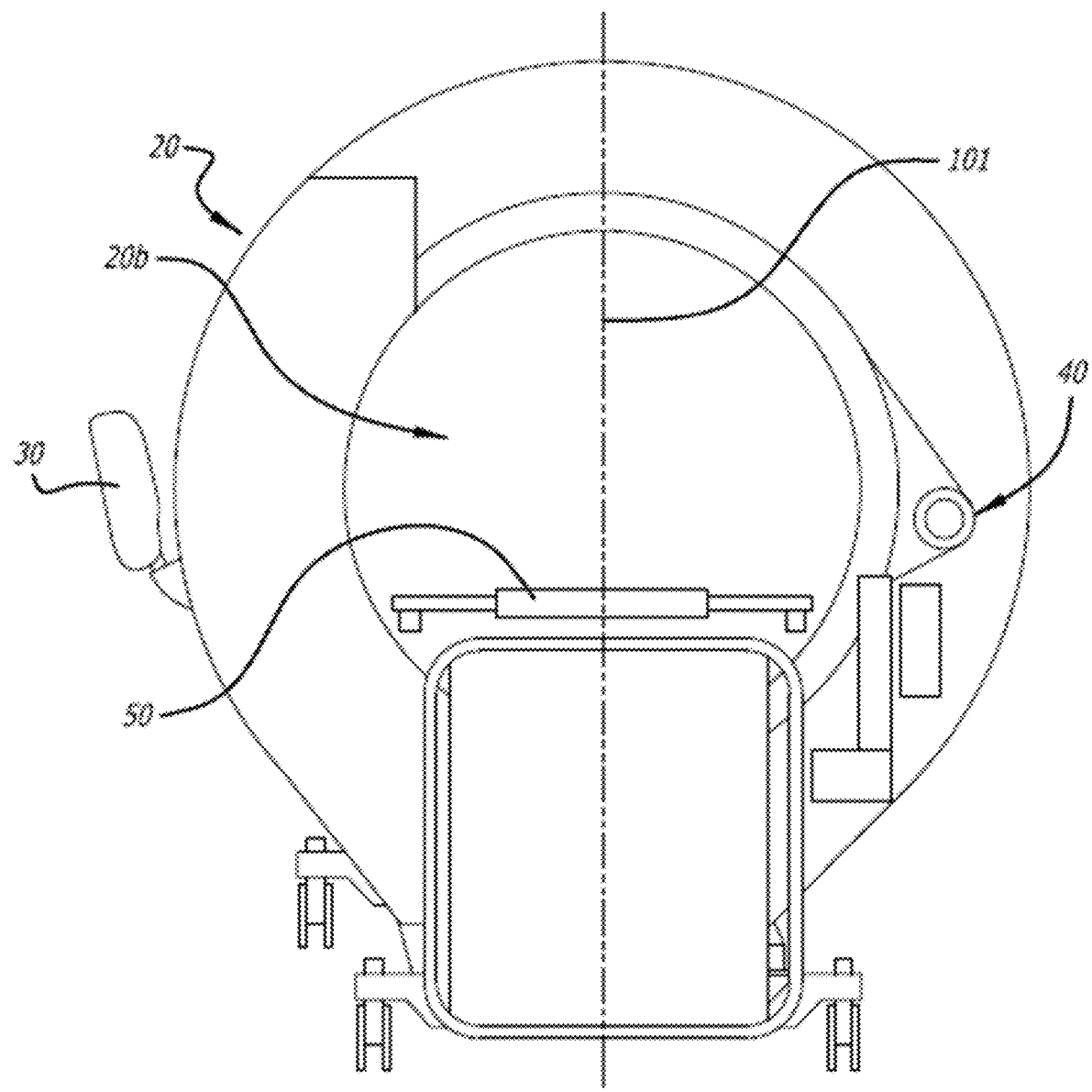
FIG. 4A illustrates another view, partly in cross-section, of the radiological imaging device of FIG. 1.
Figure 4B:
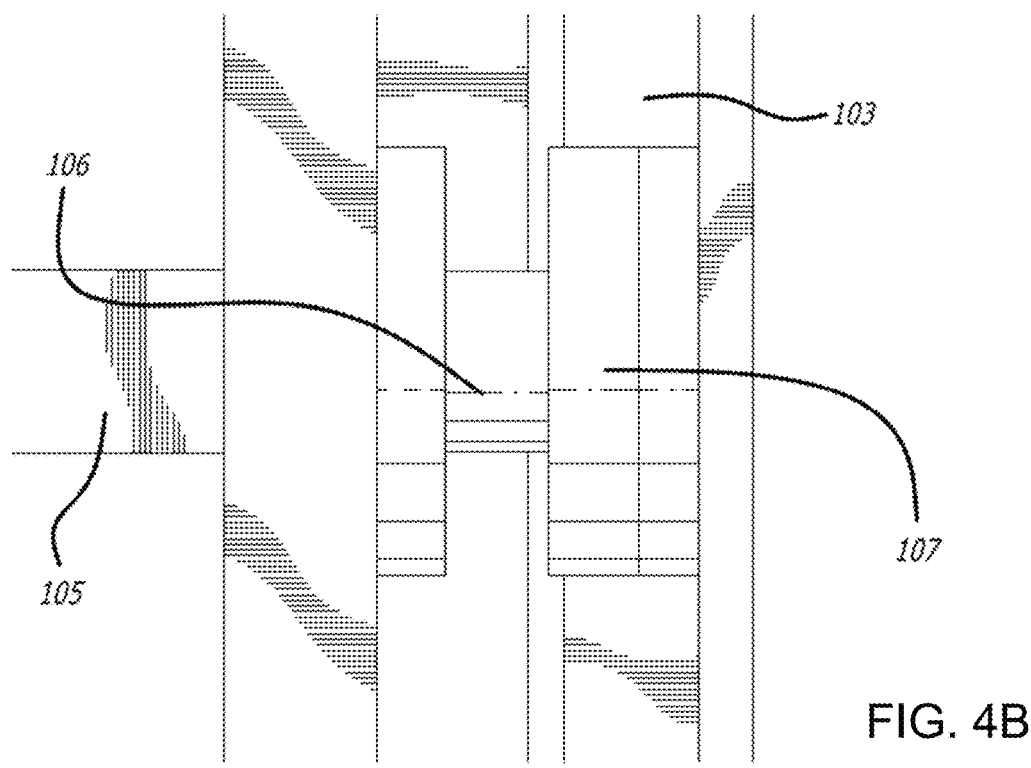
FIG. 4B illustrates a partial view of an embodiment of a gantry rotation apparatus of the radiological imaging device of FIG. 4A.
Figure 4C:
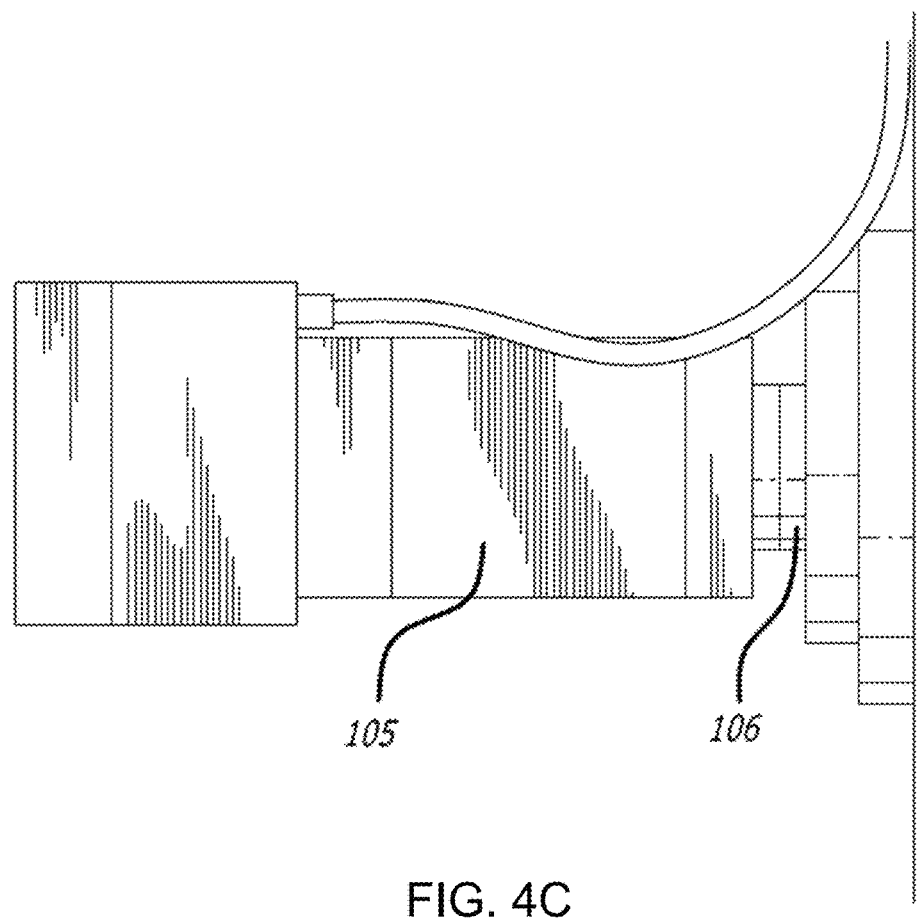
FIG. 4C illustrates another partial view of the embodiment of the horizontal rotation apparatus of the radiological imaging device of FIG. 4B.

In one embodiment, gantry 20 includes a gantry rotation apparatus 40 (FIGS. 4A-4C) to rotate radiation source 21 and radiation detector 102 together around axis of extension 20a to allow radiological imaging device 1 to perform a rotational scan of the portion of the patient that has been placed in analysis zone 20b (FIG. 1). In another embodiment, gantry rotation apparatus 40 rotates radiation (X-ray) source 21 and radiation detector 102 rapidly around the axis 100 of the bore of the gantry (FIG. 1) to obtain a volumetric scan of a patient. The rapid rotation of the source and the receiving device about bore axis 100 of the gantry (namely, axis of extension 20a) using gantry rotation apparatus 40, can be accomplished with great stability while minimizing slippage.

In some embodiments, gantry rotation apparatus 40 includes a gantry source/detector ring 103 (FIG. 4B) to which radiation source 21 and radiation detector 102 are mounted, and a static ring (not shown) connecting gantry source/detector 103 ring to transportation mechanism 25. In one embodiment, gantry source/detector ring 103 can be attached to the static ring in a cantilever manner.

Gantry rotation apparatus 40 further includes a rotational motor 105 or gantry axis rotation motor (FIGS. 4B-4C) that is integral with the static ring, a gearbox 106 or gantry axis rotation gearbox that is driven by motor 105, and a rotational bearing 107 or gantry axis rotation bearing interposed between the rings. Rotational bearing 107 includes a low-slip bearing member and is connected to gearbox 106. Rotational bearing 107, which is housed inside of gantry 20, drives the rotation of gantry source/detector ring 103 via a rotational contact of rotational bearing 107 to gantry source/detector ring 103. In particular, motor 105 drives gearbox 106, which in turn rotates rotational bearing 107, which thus rotates, with respect to the static ring, gantry source/detector ring 103 through contact between these two members (in embodiments, a drive belt arrangement may be used). Operation of motor 105 and, thus, rotational bearing 107 can be controlled by control unit 30. In some embodiments, it is preferred to minimize slippage between rotational bearing 107 and gantry source/detector ring 103, such that these two members rotate substantially in unison, and the loss of control over the rotation is minimized. In some other embodiments, the amount of friction between rotational bearing 107 and gantry source/detector ring 103 is desired to be increased in order to minimize the slippage between these members. The amount of friction can be increased by, for example, producing these members out of materials having desired coefficients of friction or by adding various coatings or texturing to one or both of these members to achieve a desired coefficient of friction.

Figure 2D:
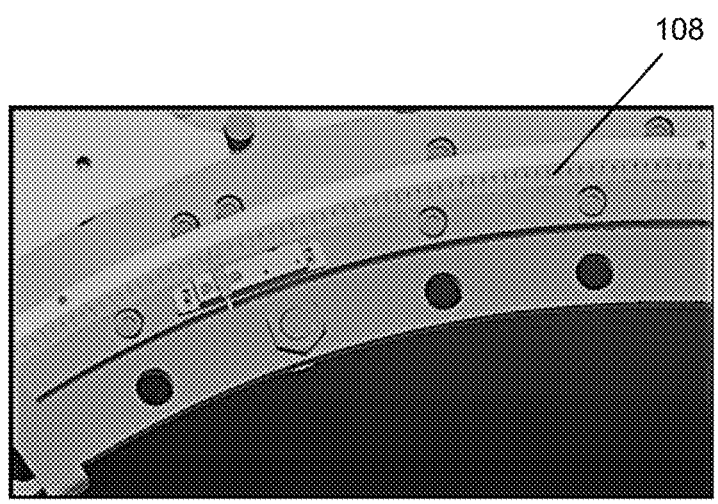
FIG. 2D is a partial cut-away view of the perforated, laser-tracked ring, according to an embodiment of the present invention.

In one embodiment, gantry 20 further includes a perforated, laser-tracked ring 108 (FIGS. 2A and 2D) integrated with gantry source/detector ring 103 that records data relating to rotation of gantry source/detector ring 103 about bore axis 100 of gantry 20. A laser emitter and a detector (not shown) that detects openings (e.g., perforations uniformly and angularly spaced, e.g., by about 0.5 degrees) in the perforated, laser-tracked ring 108 as the ring rotates around bore axis 100 are used to record data relating to the rotation of gantry 20. By recording the data relating to the rotation of gantry 20, both the orientation and the speed of gantry source/detector ring 103 can be monitored and analyzed using various software embedded in control unit 30, which in turn can reduce slippage and potential errors in the rotation of gantry 20. In another embodiment, by detecting the openings in perforated, laser-tracked ring 108, the slippage between rotational bearing 107 and gantry source/detector ring 103 can be minimized.

In some embodiments, the rotational motion of gantry source/detector ring 103 is controlled by a standard closed-loop method. In this closed loop method, as gantry source/detector ring 103 rotates, the laser emitter/detector provides pulses as the openings in perforated, laser-tracked ring 108 are detected. In order to determine whether an error in the positioning of the gantry source/detector ring 103 has occurred due to, for example, motion slippage, the desired motion of rotation of gantry source/detector ring 103 is defined as an angle $\Theta$.

Following is a method to minimize slippage between rotational bearing 107 and gantry source/detector ring 103 of gantry 20. The method starts with applying accelerating rotation on gantry source/detector ring 103 until gantry source/detector ring 103 reaches a desired velocity (with any suitable velocity shape). As gantry source/detector ring 103 accelerates up to the desired velocity, pulses are counted in order to compute the real or actual angular span or displacement ($\alpha$), which occurs during the accelerated motion. Once gantry source/detector ring 103 reaches a constant velocity of rotation, the pulses are continuously counted in order to track the real angular position (given by angle $\beta$) of gantry source/detector ring 103. The real angular position of gantry source/detector ring 103 can be calculated from the following formula:

$$\beta = \Theta - \alpha + \Delta,$$

where Δ corresponds to a relatively small angle equivalent to a few pulses. Once gantry source/detector ring 103 reaches the angular position of β, it is subjected to a deceleration to bring it to a stop following the velocity curve used in the acceleration phase in reverse, so that the angular span during this deceleration phase is substantially equal to α. In this embodiment, the final angular position of gantry source/detector ring 103 is substantially equal to ⊖+Δ during rotation, since the role of Δ is to ensure that the final number of pulses is at least equal to the desired number of pulses, given that an extra pulse is acceptable.

In another embodiment of minimizing slippage between rotational bearing 107 and gantry source/detector ring 103, the values of α, β, ⊖, and Δ are defined in the same manner. However, in this embodiment, a standard velocity loop is used. Moreover, in this embodiment, a velocity shape is defined (e.g., trapezoidal or S-shaped) for the point-to-point motion of gantry source/detector ring 103 from zero (0) to ⊖, and a relationship between angle β and the desired angular velocity is computed. For each detected pulse, a counter is incremented, allowing for the tracking of angle β. Once the counter reaches the desired angular velocity, i.e., β=⊖−α+Δ, such that the last desired pulse is detected, the rotation of gantry source/detector ring 103 is definitively stopped. Thus, in this embodiment, the extra stroke Δ is not needed to implement the method.

The detecting of the openings (i.e., perforations) in perforated, laser-tracked ring 108 can also be used to drive the emission of the radiation via radiation source 21. In particular, in one embodiment, the detection of each opening in perforated, laser-tracked ring 108 via the laser emitter/detector combination as the ring rotates around bore axis 100 can be used to drive the emission of the radiation via radiation source 21. Alternatively, detecting every other opening, or every third opening, or every fourth opening, etc., in perforated, laser-tracked ring 108 via the laser emitter/detector combination can be used to drive the emission of the radiation via radiation source 21.

Figure 5:
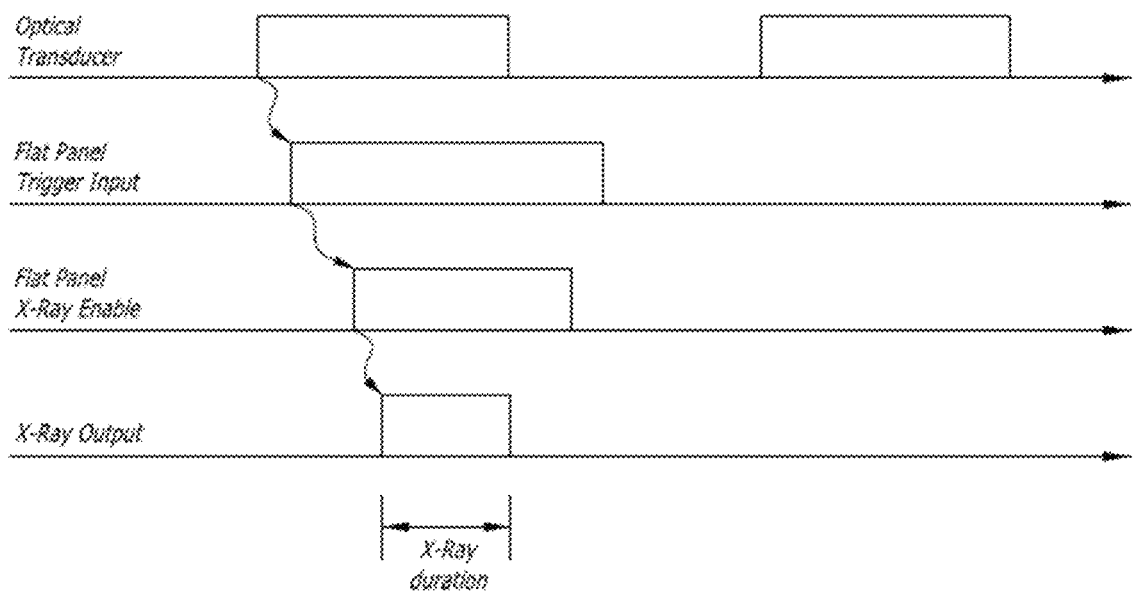
FIG. 5 is a graph according to which the emission of X-rays by the radiation source and the acquisition of images via the radiation detector of the radiological imaging device are controlled, according to an embodiment of the present invention.

According to another embodiment, the emission of X-rays by radiation source 21 and the acquisition of images via radiation detector 102 of radiological imaging device 1 are controlled according to the graph of FIG. 5. In this embodiment, an optical transducer, provided on a fixed position of gantry 20, gives an accurate signal (as shown in FIG. 5) for each mechanical position of gantry source/detector ring 103 with respect to the required resolution. The accurate signal provided by the optical transducer is generated as each opening, or every other opening, or every third opening, etc. in perforated, laser-tracked ring 108 is detected via the optical transducer. The number of openings detected in perforated, laser-tracked ring 108 depends upon the desired resolution of the scanned images (e.g., 720 pulses per revolution). The signal from the optical transducer is used to generate a trigger signal or Flat Panel Trigger Input, as shown in FIG. 5, to drive radiation detector 102 (e.g., the flat panel sensor) acquisition. Accordingly, radiation detector 102 generates a dedicated signal or the X-Ray Enable (in FIG. 5) to indicate that the panel is ready to be irradiated by the X-ray source.

Continuing with the embodiment with respect to FIG. 5, when the signal generated by radiation detector 102 or the X-Ray Enable (in FIG. 5) goes high, the internal electronics circuitry of radiological imaging device 1 drives the X-Ray source or the X-Ray Output in FIG. 5 to produce an irradiation of the desired duration. In the event that the signal from radiation detector 102 or the X-Ray Enable (in FIG. 5) goes low, radiation detector 102 (e.g., the flat panel sensor) should no longer be irradiated. Irradiation of the detector when this signal is low (e.g., disabled) lead to artifacts in the acquired images, which in turn can lead to poor image quality. Accordingly, in this embodiment, the internal electronics circuitry of radiological imaging device 1 prevents it from producing poor quality images. Although, the embodiment described above utilizes a single optical transducer, multiple optical transducers can be provided in order to optimize the scanning of images by radiological imaging device 1. Furthermore, in yet another embodiment, radiation detector 102 shall no longer be irradiated when the output signal gets high or low and, therefore, changes, in order to have up to 1440 pulses per revolution.

The specific components and configuration of gantry rotation apparatus 40 of the embodiment of radiological imaging device 1, as discussed above, can be altered without departing from the spirit of the invention. In another embodiment, for example, gantry rotation apparatus 40 can include at least one of horizontal or vertical wheels in a guide track, a base with a wheel seat for the gantry, treads, gears, an electric rotational motor, air-separated, magnetically-balanced or lubricated contacting rings, direct-drive motors, or manual manipulation. Moreover, a volumetric scan of the patient or at least a portion of the patient can alternatively be obtained, for example, by way of a scanning tube (e.g., CT scanning tube) or by using C-arm or robotic arm sensors and source mounts.

Figure 6A:
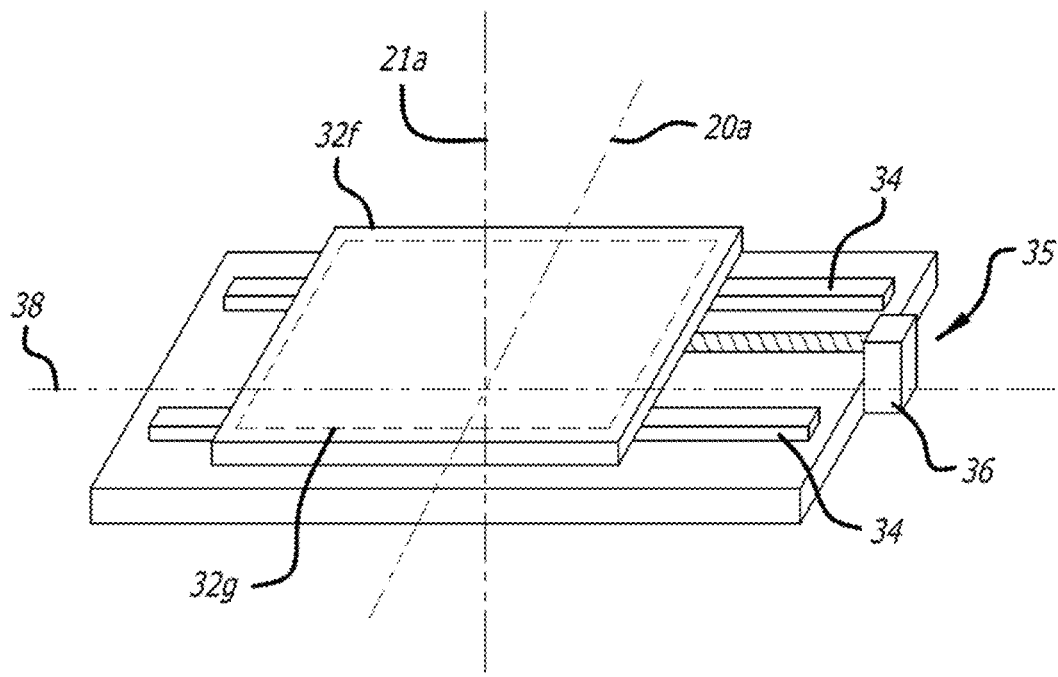
FIG. 6A illustrates a matrix mode of a flat panel sensor subassembly of the imaging device of FIG. 1, according to an embodiment of the present invention.
Figure 6B:
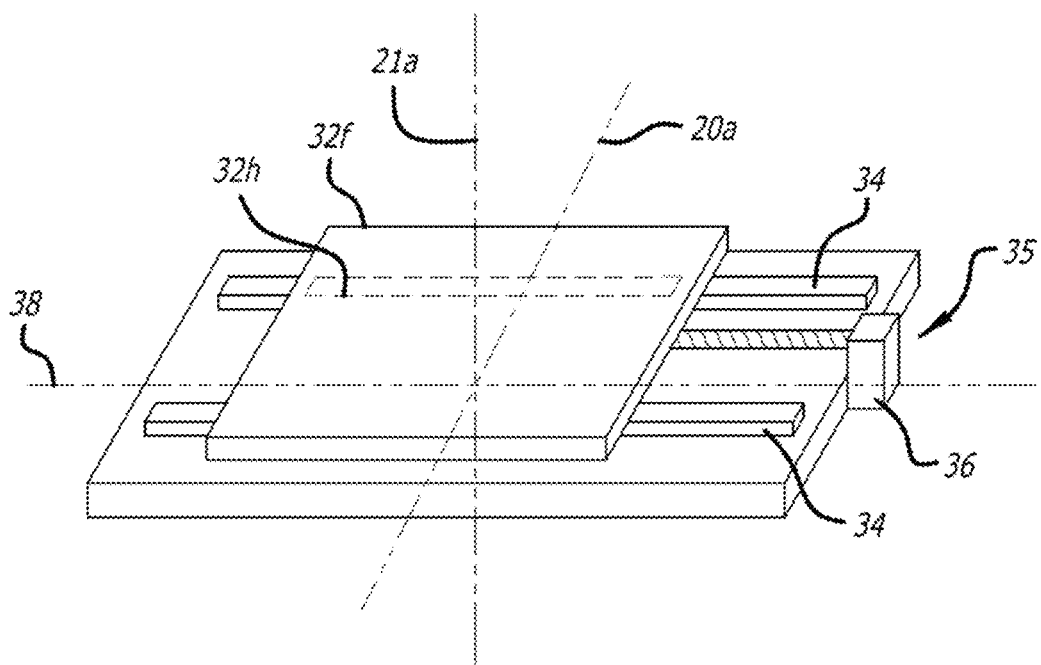
FIG. 6B illustrates a linear sensor mode of a flat panel sensor subassembly of the imaging device of FIG. 1, according to an embodiment of the present invention.

Next is an embodiment of radiation detector 102. In this embodiment, radiation detector 102 includes at least one flat panel sensor 32*f* (as shown in FIGS. 6A and 6B) that includes an array of pixels. Different positions of flat panel sensor 32*f* (e.g., left, middle, right) may be read. Flat panel sensor 32*f* is capable of operating in multiple independent read-out modes, including a matrix mode (FIG. 6A) and a linear sensor mode (FIG. 6B). The independent read-out modes of flat panel sensor 32*f* are selectable by control unit 30. In this embodiment, operating flat panel sensor 32*f* in the matrix mode is referred to as the first active configuration, and operating flat panel sensor 32*f* in the linear sensor mode is referred to as the second active configuration of radiation detector 102, respectively.

In the first active configuration (i.e., the matrix mode, as shown in FIG. 6A), flat panel sensor 32*f* outputs signals to control unit 30 corresponding to the radiation detected by the pixels in a region of sensitive surface 32*g* of flat panel sensor 32*f* (FIG. 6A). In one embodiment herein, sensitive surface 32*g* is substantially coextensive with the entire array of pixels of flat panel sensor 32*f*. The matrix mode of the flat panel sensor is suitable for performing at least tomography and fluoroscopy.

In the second active configuration (i.e., linear sensor mode, as shown in FIG. 6B), flat panel sensor 32*f* outputs signals to control unit 30 corresponding to the radiation detected by the subset of pixels in a region of sensitive surface 32*h* of flat panel sensor 32*f* (FIG. 6A). Sensitive surface 32*h* of flat panel sensor 32*f* functions effectively as a linear sensor. Specifically, in this embodiment, sensitive surface 32*h* has a frame rate in the range of approximately 10 to 300 frames per second and a width that is substantially greater than its length. In the example depicted, the length of sensitive surface 32*h* is defined in a direction substantially parallel to axis of extension 20*a*, wherein the width of sensitive surface 32*h* is defined in a direction substantially perpendicular to axis of extension 20*a* and central axis of propagation 21*a*. In embodiments, other configurations are possible, such as having the length and width of the sensitive surface 32h oriented at a defined angle, e.g., 90 degrees, relative to the axis of extension 20a.

The second active configuration of flat panel sensor 32f is useful for performing fan beam tomography. As described with reference to FIG. 2B, fan beam tomography can be performed by shaping the radiation emitted by radiation source 21 into a fan-shaped beam using, for example, collimator 76. However, by selecting a portion (i.e., a subset) of flat panel sensor 32f as a radiation sensitive surface, flat panel sensor 32f can operate in multiple modes. Moreover, switching from fan beam imaging to cone beam imaging can be easily achieved by selecting a subset of flat panel sensor 32f as a radiation-sensitive surface, without altering the operation of radiation source 21 or physically interchanging any components of radiological imaging device 1. That is, for a cone-shaped beam of radiation, operating flat panel sensor 32f in the linear sensor mode will provide sensitive surface 32h that is effectively sensitive only to a fan-shaped cross-section of the cone-shaped beam of radiation. Accordingly, when the radiation source 21 emits a cone-shaped beam of radiation, cone beam tomography can be performed using control unit 30. For example, the matrix mode of flat panel sensor 32f and fan beam tomography can be performed by selecting via control unit 30, for example, the linear sensor mode of flat panel sensor 32f.

The pixel array size of sensitive surfaces 32g and 32h of flat panel sensor 32f can be predefined in hardware, firmware, software, or other control means of the panel sensor 32f. In one embodiment, flat panel sensor 32f may be a model which can operate in a matrix mode that provides a sensitive surface 32g having, e.g., a 1096×888 or a 2192×1776 array of pixels. In such a case, the flat panel sensor may also separately operate in a linear sensor mode that provides a sensitive surface 32h, having, e.g., an 1816×60 array of pixels.

In some embodiments, flat panel sensor 32f can be mounted on a panel motion system 35 that includes guides 34 and a motorized transportation mechanism 36 (FIGS. 6A and 6B). Panel motion system 35 is suitable for moving flat panel sensor 32f along an axis 38, which is substantially perpendicular to both axis of extension 20a and central axis of propagation 21a. In one embodiment, during the linear mode of operation of the panel sensor 32f, axis 38 remains parallel to the width of the sensitive surface 32h of the panel sensor 32f.

A process 700 of scanning at least a portion of a patient using radiological imaging device 1 will now be described with reference to FIG. 7. In operation 702, radiological imaging device 1 initializes itself to perform the scanning process. Next, in operation 704, the operator positions the patient on a bed. In some embodiments, the operator may activate the laser positioning system (including lasers 72 and 74, as shown in FIGS. 3A and 3B), which projects horizontal visual markers 73 to assist the operator in adjusting the height and inclination of the patient in reference to gantry 20. The laser positioning system may also project a top-down marker 75 to assist the operator in laterally adjusting the patient in reference to gantry 20.

Additionally, in operation 704, the operator may operate control unit 30 to specify imaging parameters, such as the portion of the body on which to perform a scan. In some embodiments, the operator also inputs patient information (e.g., species, weight, and/or tissue type to be imaged) to control unit 30 and commands control unit 30 to automatically configure radiological imaging device 1 to select the appropriate radiation dose based on the patient information.

Next, the scouting procedure is performed. As mentioned above, scouting generally involves taking a preview or an overview image to assess the size, shape, and exact placement of the area to be diagnosed. The innovation in this aspect of the disclosed embodiments is to take a series of images along the length of an area of a patient and then merge the images into a single scouting image in a geometrically reliable way.

Figure 8A:
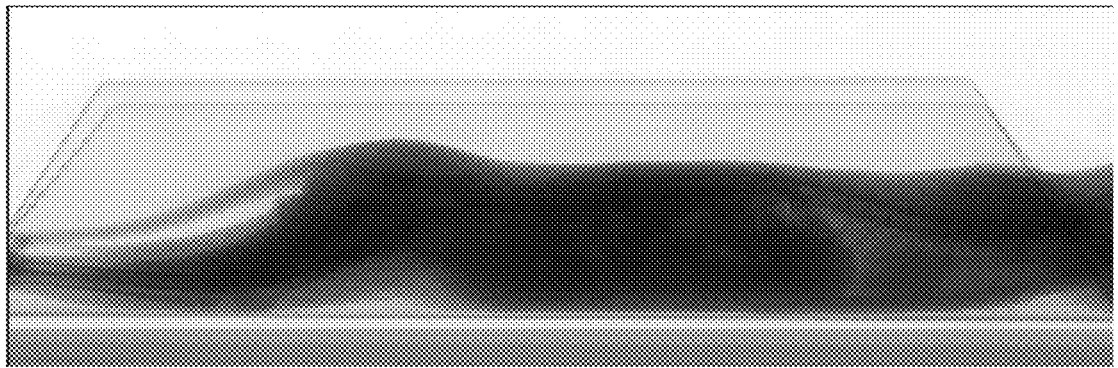
FIG. 8A shows an example of a composite scouting image for a clinical animal patient, according to an embodiment of the of the present invention.

FIG. 8A shows an example of a composite scouting image for a clinical animal patient. The scouting image is, in a sense, a flat preview of a portion of the patient to be imaged. In this example, the composite image is formed from about 220 scouting images acquired a 900 mm scouting acquisition, i.e., a scouting process in which the distance of the linear movement of the gantry is 900 mm. From each individual scouting image formed along the 900 mm scouting acquisition, a portion of about 4 mm (i.e., about 4 mm in the direction of linear movement of the gantry) is taken from the image to be used to produce the composite scouting image. The composite scouting image may be used to determine, inter alia, the number of stacks required to perform a desired CT acquisition.

Figure 8B:
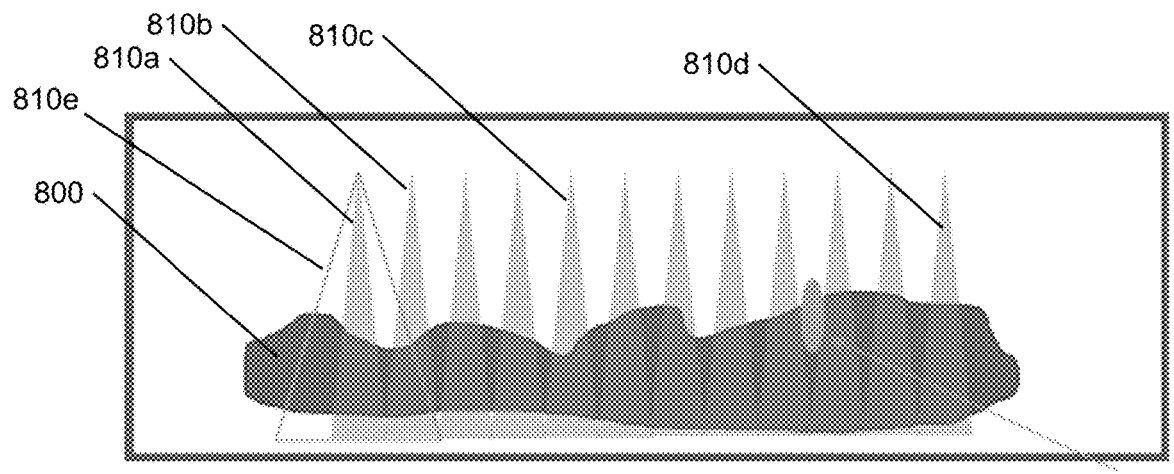
FIG. 8B depicts a patient and the radiological beam fields of a fan-shaped beam at successive locations along the length of the patient, according to an embodiment of the of the present invention.

FIG. 8B shows a patient 800 and schematic drawing of the radiological beam fields (in this example, a fan-shaped beam) 810a, 810b, 810c, 810d at successive locations along the length of the patient. The beam fields overlap, allowing a full-length composite scouting image to be generated via stitching. Stitching of the images involves processing the separate images using various available computer vision and machine learning software tools, e.g., OpenCV (Open Source Computer Vision Library), to produce a single composite image. Collimating the beam allows the radiation dose to be reduced so that only the useful part of each image is used to generate the final scouting image. In contrast, the triangular region 810e represents a radiologic field of an equivalent uncollimated cone beam.

Accordingly, referring again to FIG. 7, in operation 706, the operator sets the start and end locations for the scouting acquisition. In operation 708, the operator acquires the images to be stitched into the scouting image. To generate the images to be stitched, the gantry is advanced linearly, in a direction of axis 100 (see FIG. 1), in a controlled manner from the start location to the end location while the images are being taken. In embodiments, the generation of the images can be stopped by the operator before the end location is reached. If the speed is constant, then the images can be stitched based on the calculated distance the gantry has traveled. This method does not work as well if the gantry is accelerating or decelerating, so another way to generate these images is by advancing the gantry by discrete motor steps—although this may significantly increase acquisition time.

In embodiments, the images to be stitched together may be generated by triggering the panel sensor and the radiation source at a series of defined geometric positions, in which case the images may be acquired at specified position regardless of the acceleration and/or speed of the gantry.

Figure 8C:
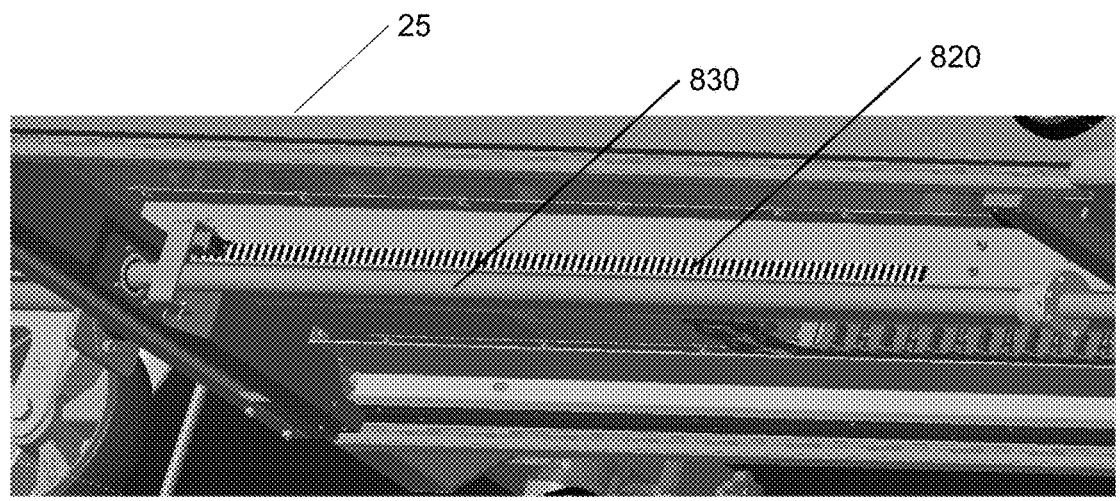
FIG. 8C shows a track positioned on the underside of the gantry transportation mechanism to produce a trigger signal at known geometric positions of the gantry, according to an embodiment of the present invention.

FIG. 8C shows a track 820 positioned, e.g., on the underside of the transportation mechanism 25, with discrete steps or notches that are spaced, for example, 5 mm or 10 mm apart. Smaller or larger intervals may also be used, such as about 4 mm to about 6 mm or about 8 mm to about 12 mm. In embodiments, the track 820 is positioned in proximity to components of the gantry linear motion system, such as the linear bearing 830, which, in embodiments, may be in the form of a ball bearing screw. Such an arrangement allows a trigger signal to be produced at known geometric positions of the gantry. The trigger signal allows images to be acquired precisely at these known positions. The images obtained in this manner are geometrically reliable and, consequently, each pixel can be related to a linear spatial position with a defined precision.

In operation 710 (see FIG. 7), the operator selects the stacks or beam thickness. Regarding the stacks, the operator can select the position and number of stacks. The number of stacks can be limited by the control unit to ensure proper acquisition workflows, taking into account the technical specifications of the system. Regarding beams and beam thickness, the operator can select a cone beam of varying thickness or a fan beam. For example, beam thicknesses of 20 mm, 50 mm, or 100 mm can be selected—other intervals may also be used. In embodiments, a beam size can be suggested by the system based on patient information, such as species, imaging target, weight, or other characterizing information. Furthermore, a beam size can be suggested by the system based on the type of imaging task. For example, if a soft-tissue target is being imaged, more image contrast is needed, so a thinner beam is suggested by the system. As a further example, if a hard tissue target is being imaged, then enough contrast is already present and therefore a larger beam size is suggested. Stack thickness is related to beam thickness as determined by the control unit. In general, it is not possible to emit a wider beam than the acquired one, i.e., wider than can be captured by the sensor, because the machine is adapted to emit only the radiation needed to achieve the desired images. In embodiments, the system can perform an acquisition in which multiple stacks are acquired. Furthermore, in embodiments, the size of the beam and of the stacks may vary between one stack and the others to acquire the desired target image with optimal beam size for a particular patient.

In general, a fan beam will reduce the dose and improve CT image quality. Image quality is improved using a fan beam due to reduced scatter artifacts that affect projection data. After the reconstruction process, this means that images acquired with a thinner beam have improved soft-tissue contrast, reduced cupping artifacts, and more reliable gray level values, i.e., Hounsfield unit (HU) values.

To obtain better images, the acquisition should be performed as fast as possible to reduce movement artifacts and at the highest frequency as possible to obtain the most collimated images with less scatter and better geometry. Acquisition frequency may be between 24 and 28 Hz for 2×2 scouting, and approximately 8 Hz for 1×1 scouting and digital radiography (DR). 1×1 means that each pixel in the flat panel is considered as a single pixel (maximum resolution>more data>slower frame rate). In binning 2×2 instead, 4 pixels are considered as an entity, therefore you have less resolution (>less data>higher frame rate) For the 2×2 scouting, this means that, for example, 28 images can be acquired each second and therefore the acquisition speed could be up to 140 mm/s for a triggering interspace of 5 mm. In embodiments, scouting other than the 1×1 and 2×2 discussed above, may be implemented depending on the technical specifications and capabilities of the panel source couple, and this may vary over time as technologies improve. These speeds and frequencies are merely examples and do not serve to limit the invention. To reduce the amount of radiation being emitted to the patient, the beam should be as collimated as possible. In another embodiment, if the patient moves, a sound may be emitted alerting the operator and/or the patient. An alert may also be shown on the operator's monitor.

Once the scouting image is acquired, an operator or healthcare provider will review the scouting image and determine if another scouting image is needed or if a more detailed tomographic image should be taken. In general, scouting images can be acquired at any fixed rotation angle of the gantry. Operators may want to acquire this type of image at a specific angle based on the anatomy of the patient and the imaging objective. In some cases, a number of angles may be acquired to better find the exact position to be scanned. One or more images can be shown together to help the operator to find out the exact position to be scanned.

Figure 9A:
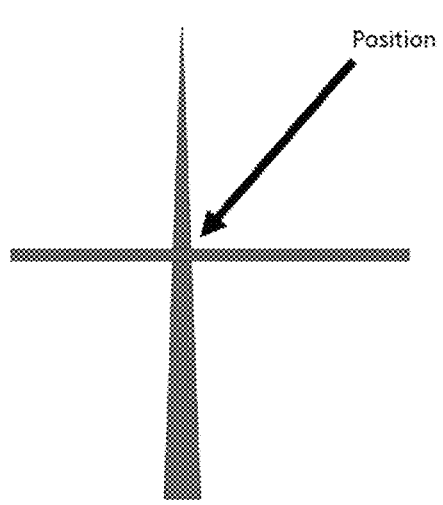
FIGS. 9A-9B are diagrams depicting the difference in beam width used for an image acquired during scouting versus a CT image, according to an embodiment of the present invention.
Figure 9B:
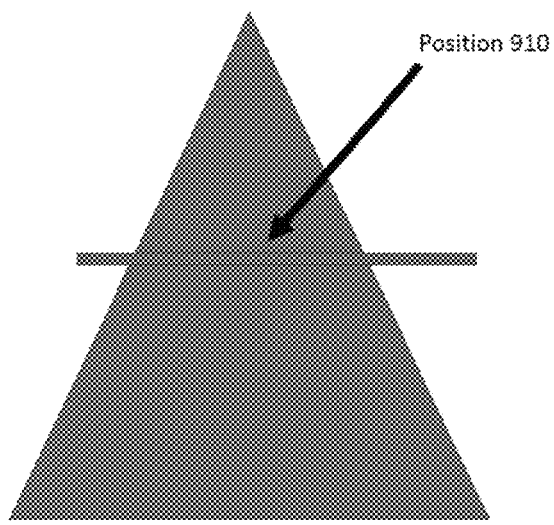

In operation 712, the operator begins to acquire the CT image. FIGS. 9A and 9B illustrate the difference in beam width used for an image acquired during scouting versus a CT image. In FIG. 9A, the image taken during scouting uses a narrow beam at a specific location—here it is shown as 910 mm. The collimator is closed to achieve such a narrow beam, e.g., about 20 mm (or, e.g., in a range of about 15 mm to about 25 mm). In FIG. 9B, the CT image uses a wider beam and images a field of about 150 mm, centered around the linear position (910 mm) of FIG. 9A, which would be between about 835 mm and about 985 mm.

In operation 714 control unit 30 responds to the aforementioned operator-specified imaging parameters and controls the gantry rotation apparatus, so as to rotate source 21 and the detector in order to orient central axis of propagation 21a in relation to the patient and/or bed. Moreover, if the operator commands control unit 30 to automatically configure radiological imaging device 1 to use an appropriate radiation dose in operation 704, control unit 30 configures source 21 and collimator 76, if necessary, in the manner described above, so as to be prepared to provide such a dose. Once central axis of propagation 21a has reached the desired inclination, radiological imaging device 1 starts scanning at operation 716.

In operation 716, during scanning of the patient's body, gantry rotation apparatus 40 rotates gantry source/detector ring 103 so that radiation source 21 and radiation detector 102 rotate together, thereby permitting the radiation to scan the entire analysis zone 20b to be imaged. As the rotation of gantry source/detector ring 103 continues, radiation source 21 emits radiation. Such radiation, after traversing the patient's body, is detected by radiation detector 102, which in turn sends a corresponding electrical signal to control unit 30.

The manner in which operation 716 is performed in a case in which radiation detector 102 includes a flat panel sensor 32f operating in a linear sensor mode with sensitive surface 32h will now be described. During a scan, radiation source 21 emits pulsed radiation, which traverses the patient's body and hits sensitive surface 32h of flat panel sensor 32f. As gantry source/detector ring 103 rotates, flat panel sensor 32f detects radiation during such rotation and sends corresponding electrical signals to control unit 30. Accordingly, control unit 30 receives a signal for the entire zone imaged and processes the signal to acquire an image of the scanned part of the patient.

In one embodiment, if desired by the operator, one or more additional scans may be performed. For each additional scan, the gantry can be translated along axis 100 by the gantry linear motion system to a new position. Next, a further scanning procedure is performed in the manner described above, that is, gantry source/detector ring 103 is rotated while radiation source 21 emits radiation and flat panel sensor 32f continuously outputs a signal to control unit 30. In this manner, a plurality of scans can be acquired, each scan being as wide as the sensitive surface 32h. The plurality of scans is then provided to control unit 30 for graphic reconstruction at operation 718.

In operation 718, control unit 30 carries out the graphic reconstruction of the zone being imaged using the readings performed by radiation detector 102. The plurality of scans acquired in operation 716 by flat panel sensor 32*f* can be reconstructed into one overall image in a manner that minimizes edge effects in overlapping regions of the plurality of images. Thus, by virtue of the gantry linear motion system, flat panel sensor 32*f* can provide an overall radiological image that is wider than sensitive surface 32*h*. The process then continues to operation 720 and ends. The operator may repeat the process or a portion thereof to acquire additional scans, as desired.

Figure 7:
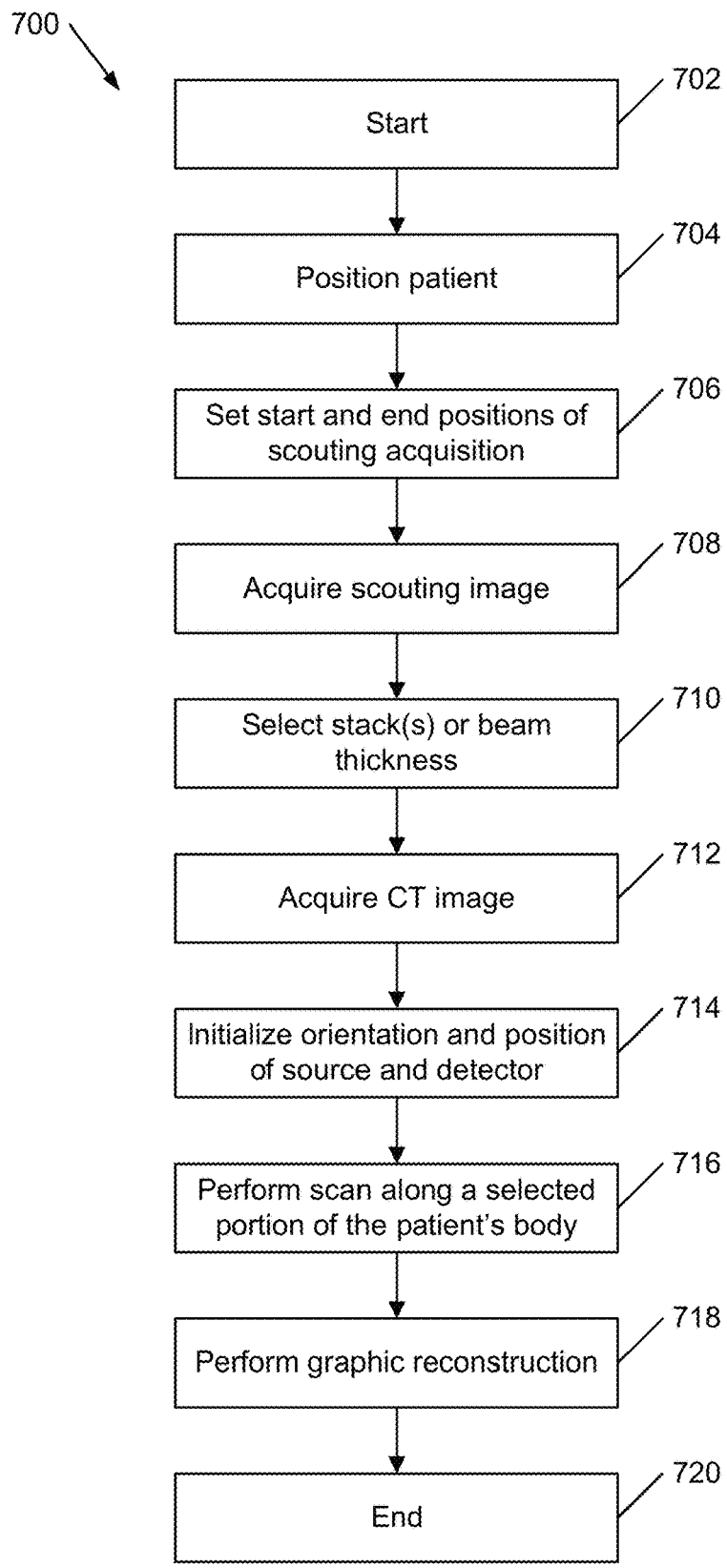
FIG. 7 is a flowchart illustrating an imaging procedure, according to an embodiment of the present invention.

Besides the operations shown in FIG. 7, other operations or series of operations are contemplated to acquire scouting and CT images. Moreover, the actual order of the operations in the flowchart in FIG. 7 is not intended to be limiting, and the operations may be performed in any practical order.

Figure 10:
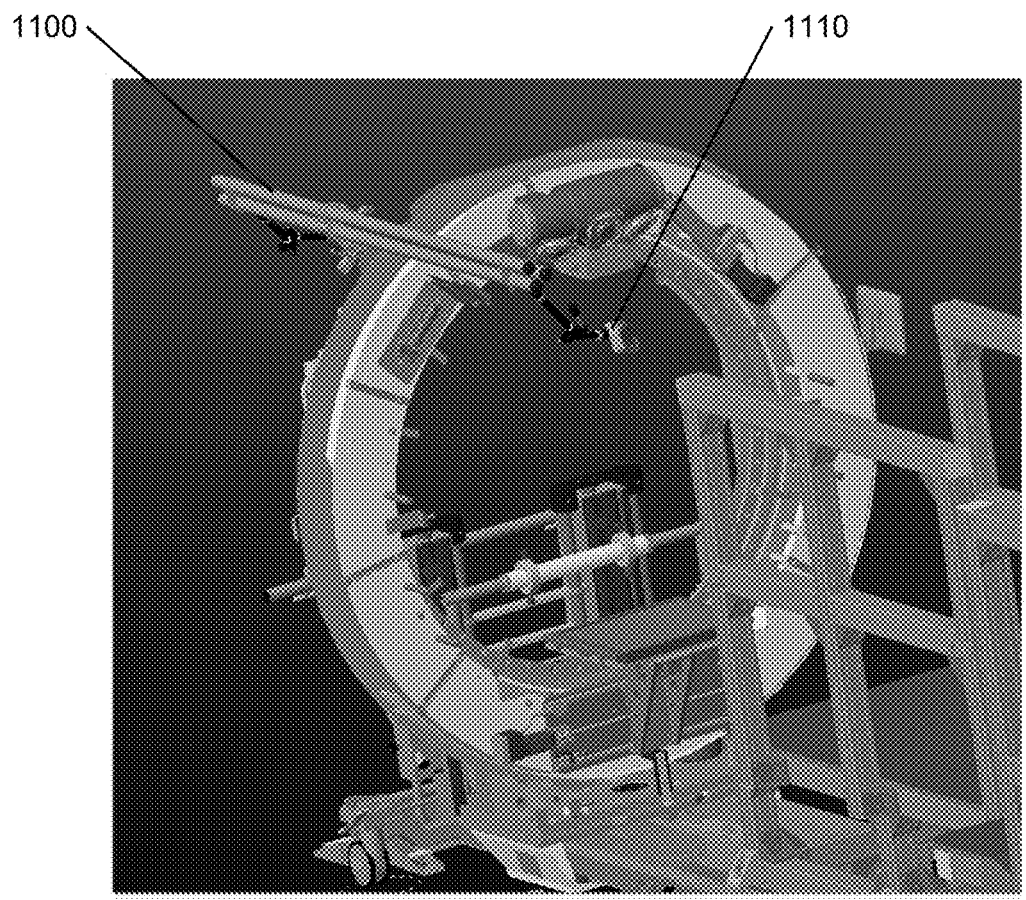
FIGS. 10 and 11 are diagrams showing a pole system attached to the gantry and including cameras, according to an embodiment of the present invention.
Figure 11:
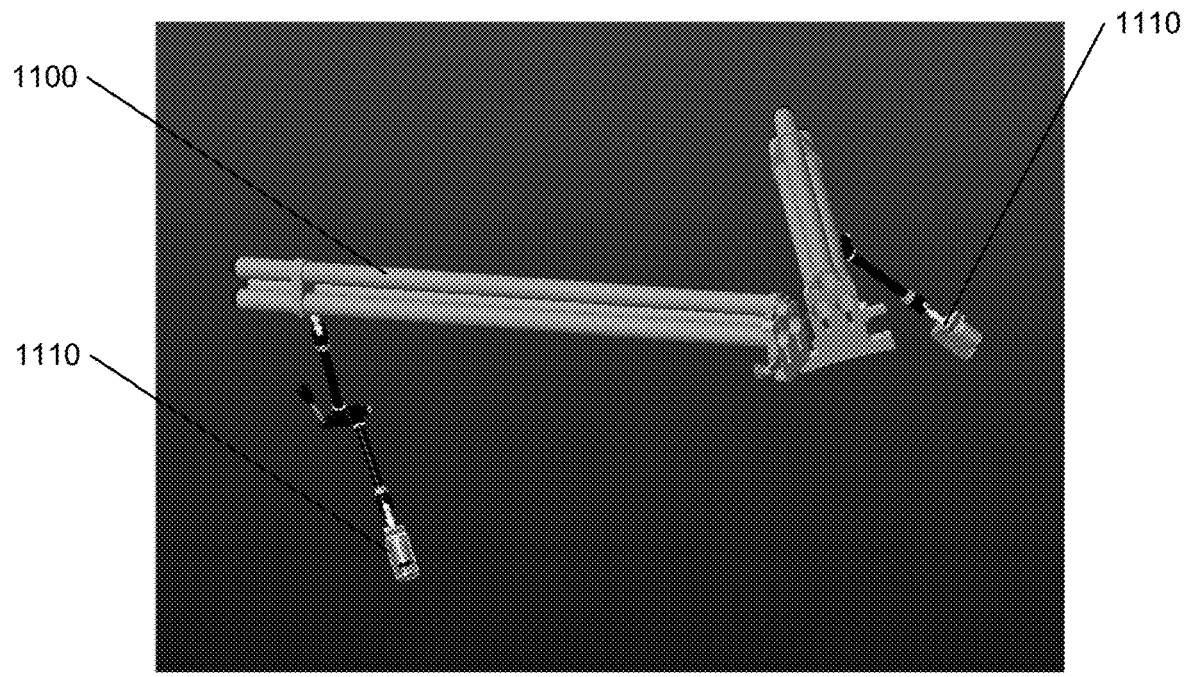

In another embodiment, shown in FIGS. 10 and 11, the gantry includes a pole system 1100 that includes one or more cameras 1110 that provide motion compensation for the patient during an imaging procedure. Because some patients (e.g., horses) are large, the cameras may get in the way of the patient entering or exiting the gantry. Pole system 1100 is hinged and foldable, as shown in FIG. 11, so that the camera can be moved out of the way of the gantry providing more space for the patient's entry and exit (or to perform a CT acquisition). Only one of the cameras needs to be moved, so the other camera can remain stationary and can be used for motion correction. Pole system 1100 may be symmetrical, allowing it to be mounted on the right or left side of the gantry depending on specific site restrictions. Pole system 1100 may be made of carbon or other lightweight material. In embodiments, the pole system 1100 is adapted to minimize oscillations and resonance by using an over-constrained mechanical configuration.

Figure 12A:
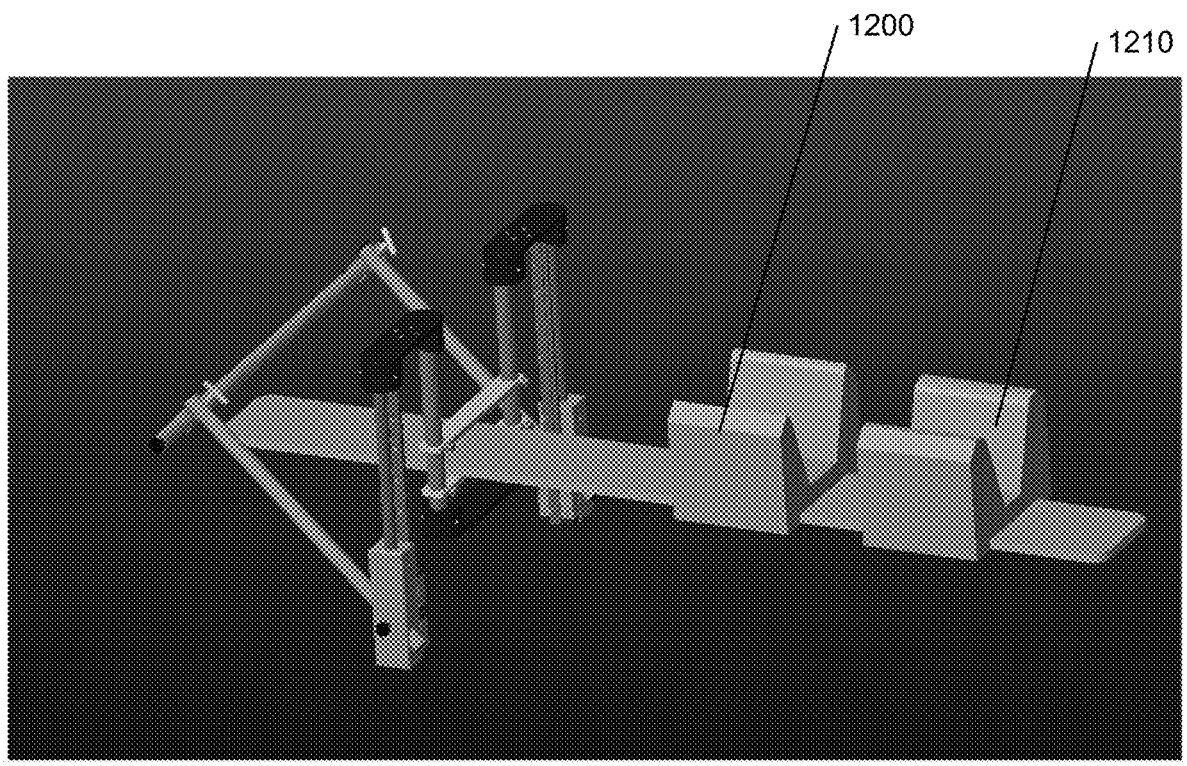
FIGS. 12A and 12B are diagrams showing a head positioning system, according to an embodiment of the present invention.
Figure 12B:
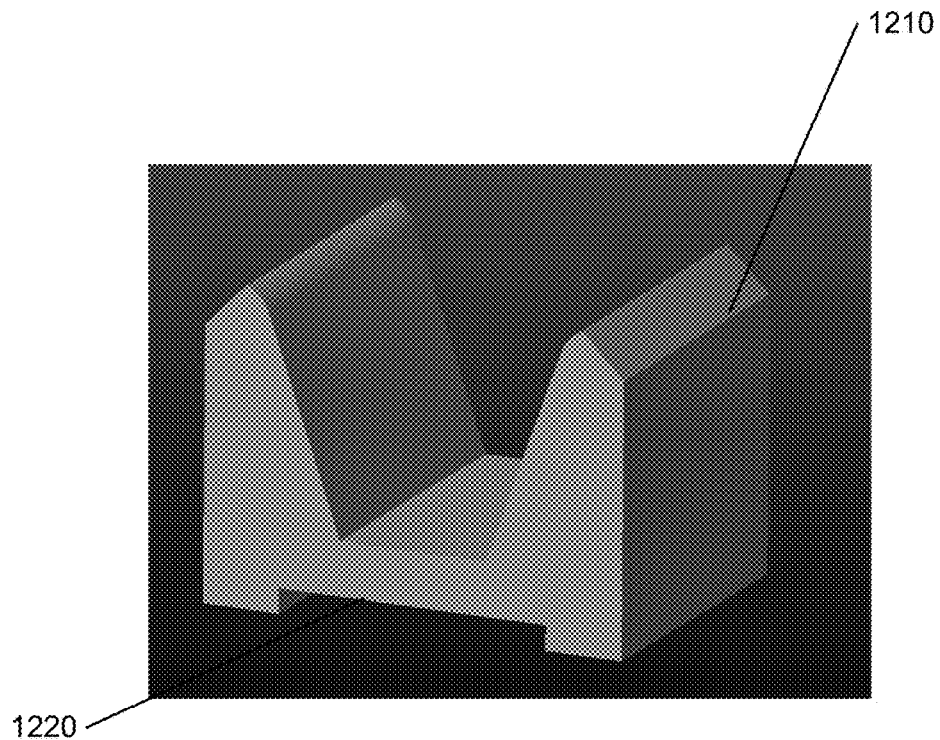

In another embodiment, shown in FIGS. 12A and 12B, radiological imaging device 1 includes a patient positioning system 1200. Such a system may include one or more patient supports 1210 (shown in detail in FIG. 12B). The v-shape of these patient supports allows the head to be held in place to contain the patient and reduce motion. Patient support 1210 may include a recess 1220 that allows it to be held in position on the bed.

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer or on a plurality of computers. The computer may include a processing unit in communication with a computer-usable medium, where the computer-usable medium contains a set of instructions, and where the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method to acquire a radiological image of a part of a patient, comprising:
 positioning at least part of the patient within an analysis zone of a radiological imaging device comprising:
  a gantry defining the analysis zone in which said at least part of the patient is positioned;
  a source suitable to emit radiation that passes through said at least part of the patient, the radiation defining a central axis of propagation;
  a detector arranged to receive the radiation and to generate data signals based on the radiation received;
  a gantry rotation ring to which the source and the detector are mounted and a rotational bearing configured to rotate the ring;
  a controller adapted to acquire an image from data signals received continuously from the detector while the gantry rotation apparatus continuously rotates the ring and the source emitting the radiation and the detector receiving the radiation that are mounted to the ring, so as to scan said at least part of the patient;
  a linear bearing that translates the gantry; and
  a sensor system to trigger acquisition of images at a defined interval as the gantry translates,
  wherein the sensor system comprises a laser-tracked track with discrete steps or notches that are spaced according to the defined interval;
 setting an imaging start location, wherein said at least part of the patient is included between the start location and an end location;
 acquiring with a radiological beam emitted by the source a series of images at the defined interval beginning at the start location and continuing until the end location is imaged; and
 stitching together the images in the series of images to form a composite scouting image.

2. The method of claim 1, wherein the pre-determined distance interval is between about 8 mm and about 12 mm.

3. The method of claim 1, wherein the pre-determined distance interval is between about 4 mm and about 6 mm.

4. The method of claim 1, wherein the radiological beam is cone shaped.

5. The method of claim 1, wherein the radiological beam is fan shaped.

6. The method of claim 1, wherein the end location is set when the start location is set.

7. The method of claim 1, wherein the end location is determined when said acquiring is stopped by an operator.

8. The method of claim 1, further comprising selecting a thickness of a stack or a thickness of the radiological beam.

9. The method of claim 1, further comprising acquiring a computed tomography image based at least in part on the composite scouting image.

10. The method of claim 1, further comprising performing a surgical procedure based on the scouting image.

11. The method of claim 1, wherein the scouting image is of the whole body of the patient.

12. The method of claim 1, wherein said acquiring is performed using a gantry comprising a rotatable ring to which a source that produces the radiological beam and a detector are positioned, and wherein said acquiring is performed at a defined rotation angle.

13. The method of claim 12, wherein a plurality of composite scouting images are acquired, each at respective defined rotation angle.

14. The method of claim 13, further comprising acquiring a computed tomography image based at least in part on said plurality of composite scouting images.

15. A radiological imaging device comprising:
- a gantry defining an analysis zone in which at least part of a patient is placed;
- a source suitable to emit radiation that passes through said at least part of the patient, the radiation defining a central axis of propagation;
- a detector arranged to receive the radiation and to generate data signals based on the radiation received;
- a gantry rotation ring to which the source and the detector are mounted and a rotational bearing configured to rotate the ring;
- a controller adapted to acquire an image from data signals received continuously from the detector while the gantry rotation apparatus continuously rotates the ring and the source emitting the radiation and the detector receiving the radiation that are mounted to the ring, so as to scan said at least part of the patient;
- a linear bearing that translates the gantry; and
- a sensor system to trigger acquisition of images at a defined interval as the gantry translates,
- wherein the sensor system comprises a laser-tracked track with discrete steps or notches that are spaced according to the defined interval.

16. The system of claim 15, wherein the pre-determined distance interval is between about 8 mm and about 12 mm.

17. The system of claim 15, wherein the pre-determined distance interval is between about 4 mm and about 6 mm.

18. The system of claim 15, further comprising a bed including a patient head support system.

19. The system of claim 15, further comprising a pole system attached to the gantry, the pole system including cameras and capable of being folded out of the analysis zone.

20. The system of claim 15, wherein the gantry rotational ring is mounted on a transportation mechanism and the laser-tracked track is positioned on an underside of the transportation mechanism.

21. The system of claim 20, wherein the linear bearing comprises a ball bearing screw which is positioned in proximity to the laser-tracked track on the underside of the transportation mechanism.

22. The system of claim 15, wherein the sensor system is configured to produce a signal based on the discrete steps or notches to trigger the acquisition of images at known linear spatial positions of the gantry.

23. The system of claim 15, wherein the source comprises a collimator configured to produce a cone-shaped beam for CT images and a fan-shaped beam for scouting images.

24. The system of claim 23, wherein the collimator is configured to produce a fan-shaped beam with a beam width of between about 15 mm and about 25 mm.

* * * * *